United States Patent
Kobayashi et al.

(10) Patent No.: US 11,326,649 B2
(45) Date of Patent: May 10, 2022

(54) REAR-WHEEL DRIVE SHAFT

(71) Applicant: NTN CORPORATION, Osaka (JP)

(72) Inventors: Masazumi Kobayashi, Shizuoka (JP);
Tomoshige Kobayashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 270 days.

(21) Appl. No.: 16/494,376

(22) PCT Filed: Mar. 8, 2018

(86) PCT No.: PCT/JP2018/008972
§ 371 (c)(1),
(2) Date: Sep. 16, 2019

(87) PCT Pub. No.: WO2018/168640
PCT Pub. Date: Sep. 20, 2018

(65) Prior Publication Data
US 2020/0240477 A1 Jul. 30, 2020

(30) Foreign Application Priority Data

Mar. 17, 2017 (JP) .............................. JP2017-052650
Mar. 2, 2018 (JP) .............................. JP2018-037350

(51) Int. Cl.
*F16D 3/223* (2011.01)
*F16D 3/2245* (2011.01)
(Continued)

(52) U.S. Cl.
CPC .............. *F16D 3/2245* (2013.01); *F16C 3/02* (2013.01); *F16D 3/227* (2013.01);
(Continued)

(58) Field of Classification Search
CPC .......... F16D 3/2245; F16D 3/227; F16C 3/02; F16C 2361/31; F16C 2361/41; Y10S 464/906
(Continued)

(56) References Cited

U.S. PATENT DOCUMENTS 6,299,543 B1 10/2001 Sone et al.
6,634,951 B2* 10/2003 Sahashi .................. B60B 27/00
464/145
2016/0138660 A1 5/2016 Hirukawa et al.

FOREIGN PATENT DOCUMENTS

JP 58-12001 7/1983
JP 10-73129 3/1998
(Continued)

OTHER PUBLICATIONS

Universal Joint and Driveshaft Design Manual, AE-7, Society of Automotive Engineers, Inc., Warrendale, PA, Chapter 14, TJ1079. S62 (Year: 1979).*
(Continued)

*Primary Examiner* — Greg Binda
(74) *Attorney, Agent, or Firm* — Wenderoth, Lind & Ponack, L.L.P.

(57) ABSTRACT

A rear-wheel drive shaft (1) includes a fixed type constant velocity universal joint (3), a plunging type constant velocity universal joint (2), and an intermediate shaft (4) coupling both the constant velocity universal joints to each other. A ratio ($PCD_{BALL}(f)/D_{BALL}(f)$) of a pitch circle diameter ($PCD_{BALL}(f)$) of balls (33) of the fixed type constant velocity universal joint (3) to a diameter ($D_{BALL}(f)$) of each of the balls (33) is set from 3.70 to 3.87. A ratio ($PCD_{BALL}(s)/D_{BALL}(s)$) of a pitch circle diameter ($PCD_{BALL}(s)$) of balls (23) of the plunging type constant velocity universal joint (2) to a diameter ($D_{BALL}(s)$) of each of the balls (23) is set from 3.3 to 3.6.

3 Claims, 15 Drawing Sheets

(51) Int. Cl.
*F16C 3/02* (2006.01)
*F16D 3/227* (2006.01)

(52) U.S. Cl.
CPC ...... *F16C 2361/31* (2013.01); *F16C 2361/41* (2013.01); *Y10S 464/906* (2013.01)

(58) Field of Classification Search
USPC ........................................ 464/140, 145, 146
See application file for complete search history.

(56) References Cited

FOREIGN PATENT DOCUMENTS

| | | |
|---|---|---|
| JP | 10-103365 | 4/1998 |
| JP | 11-278075 | 10/1999 |
| JP | 2012-97797 | 5/2012 |
| JP | 2012-233550 | 11/2012 |
| WO | 2014/208242 | 12/2014 |

OTHER PUBLICATIONS

International Preliminary Report on Patentability and Written Opinion of the International Searching Authority dated May 15, 2018 in International (PCT) Patent Application No. PCT/JP2018/008972.
International Search Report dated May 15, 2018 in International (PCT) Application No. PCT/JP2018/008972.
Notice of Reasons for Refusal dated Oct. 6, 2021 in counterpart Japanese Patent Application No. 2018-037350 with English translation.

* cited by examiner

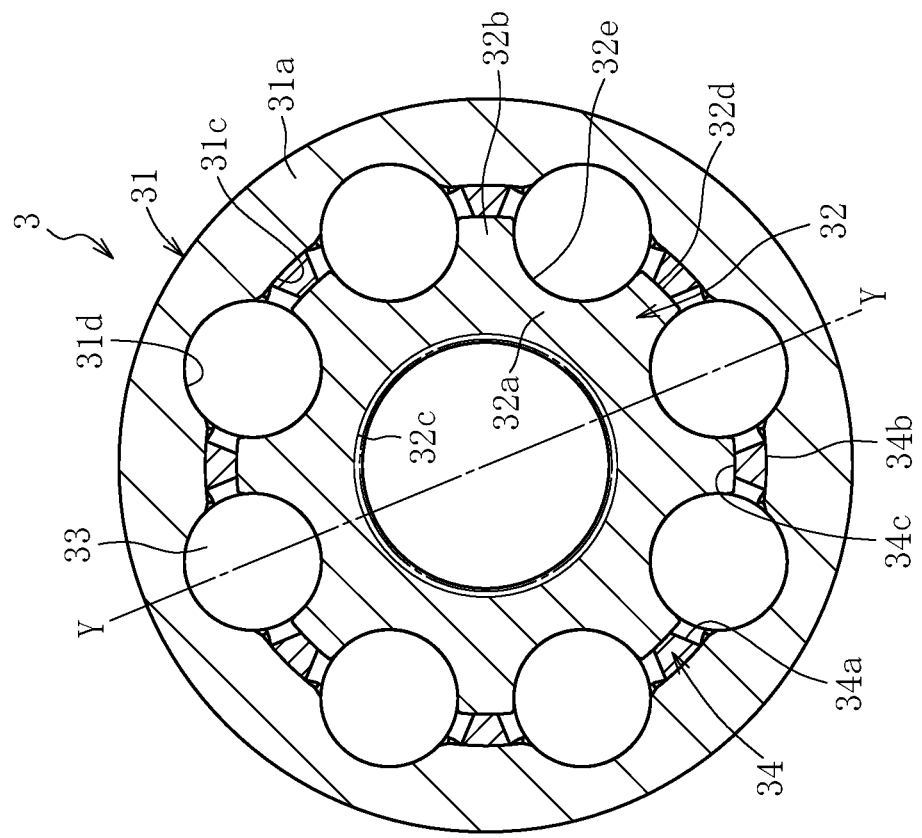
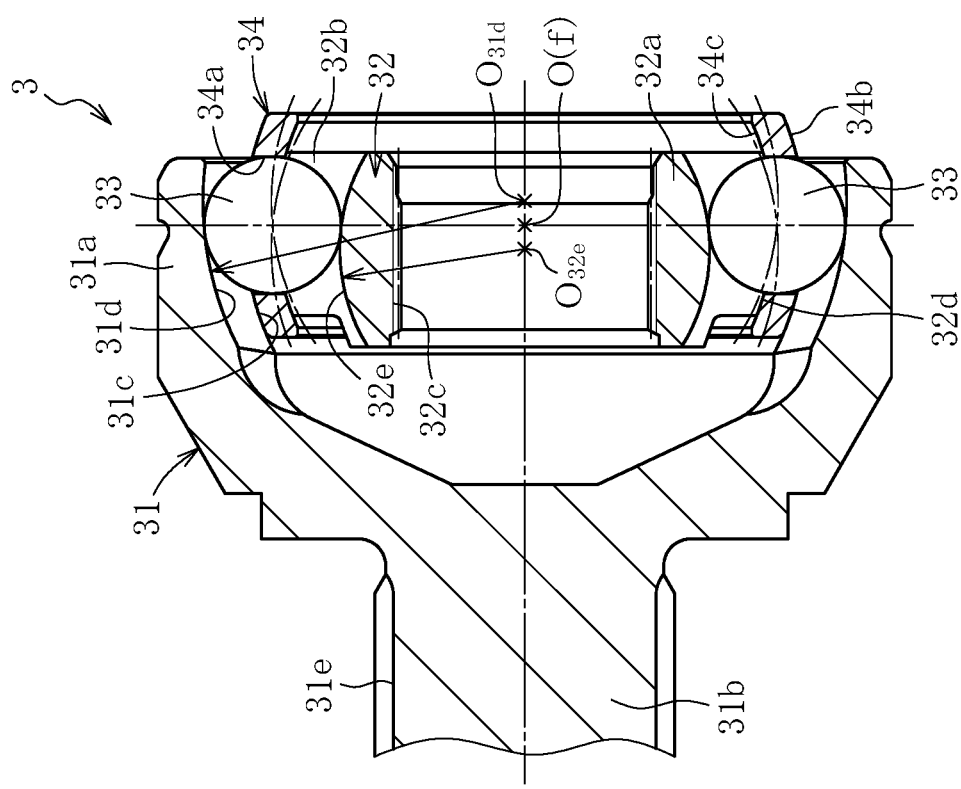

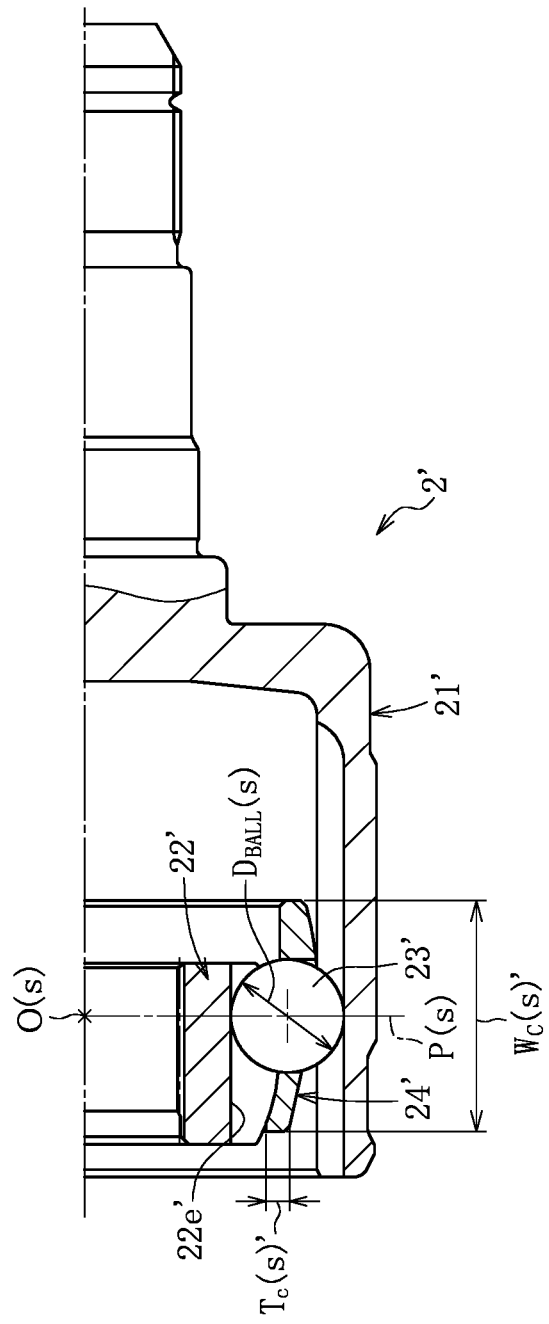
FIG. 6B COMPARATIVE PRODUCT

FIG. 7A
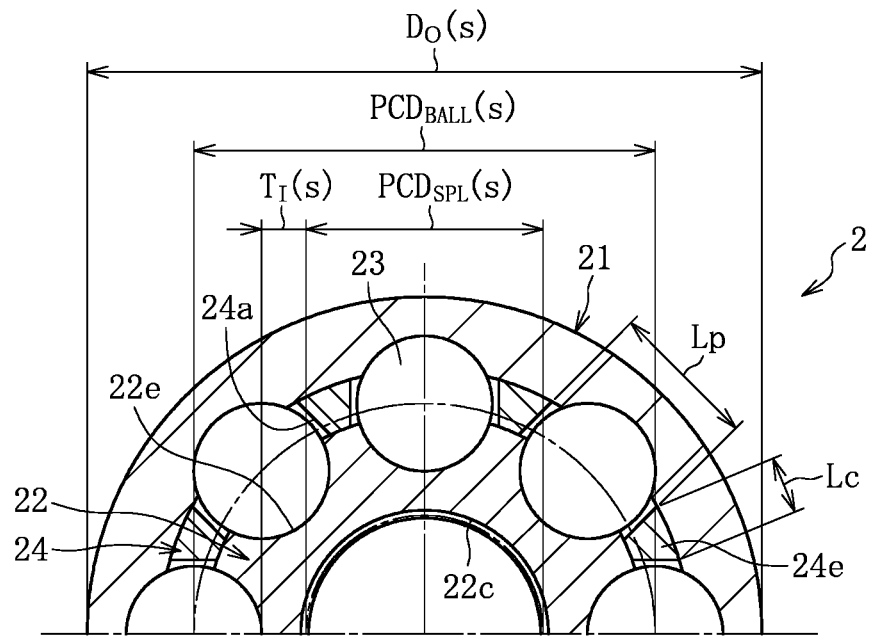
FIG. 7B COMPARATIVE PRODUCT
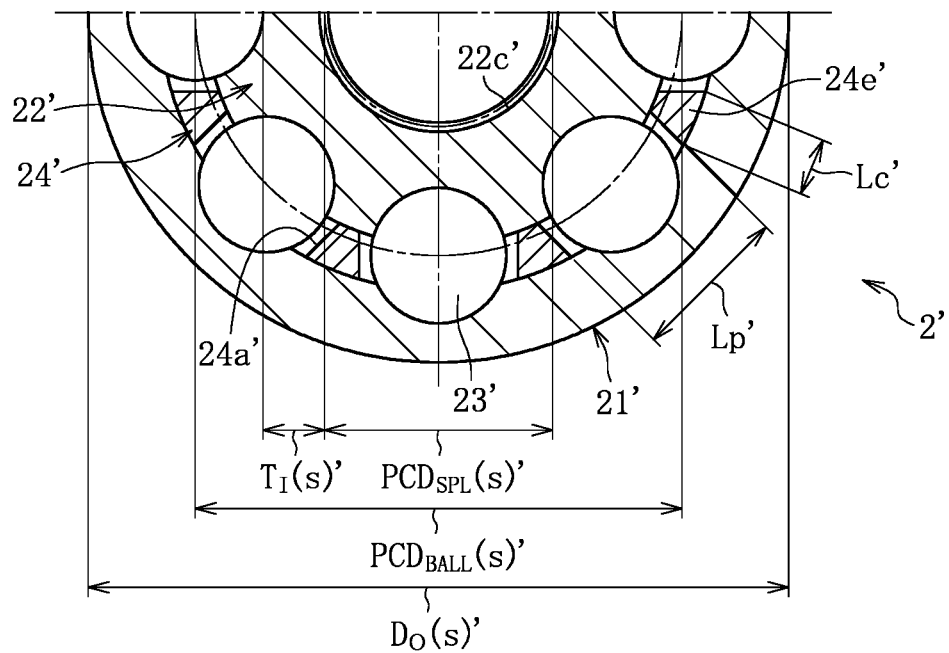

FIG. 8A
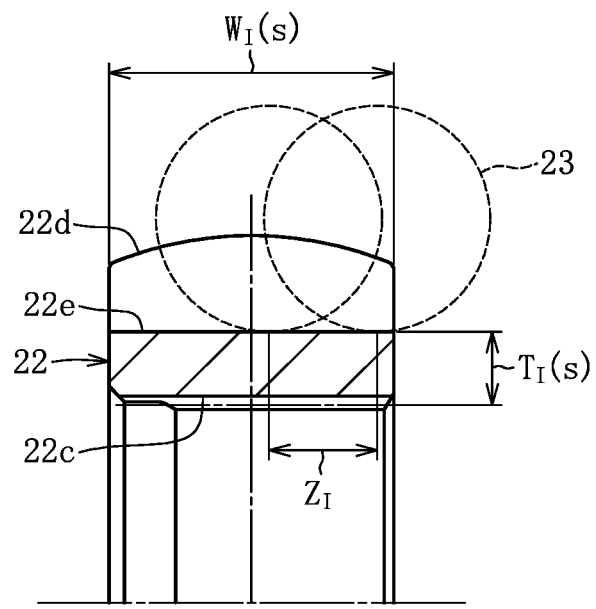
FIG. 8B  COMPARATIVE PRODUCT
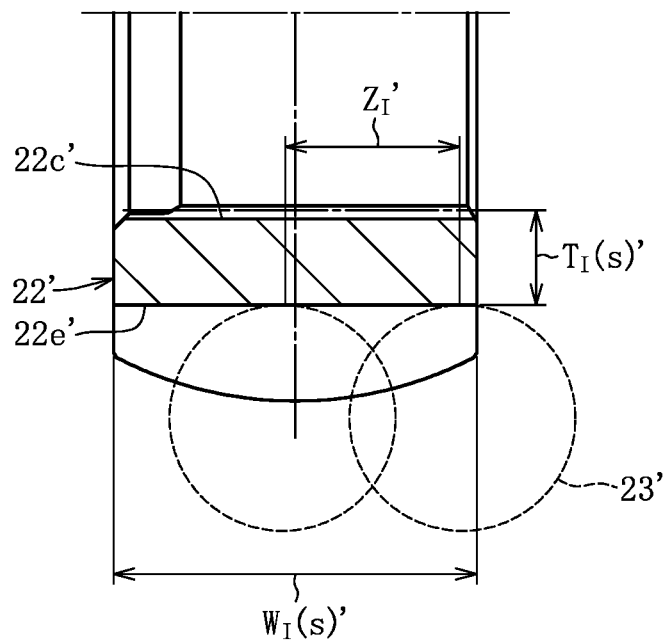

FIG. 9A1
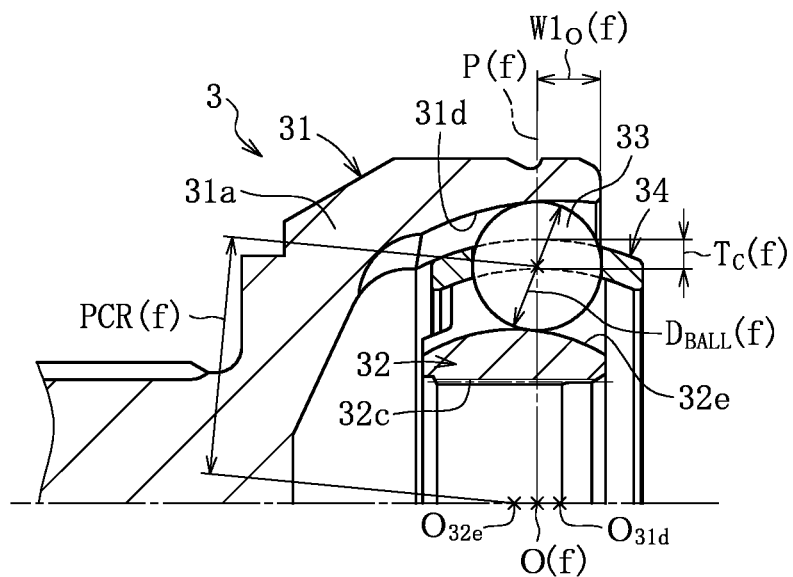
FIG. 9A2 COMPARATIVE PRODUCT
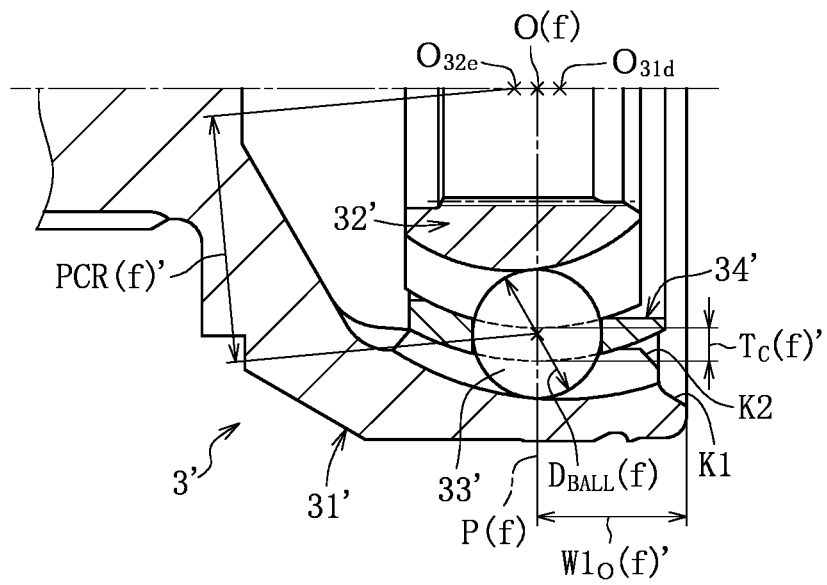

FIG. 9B1
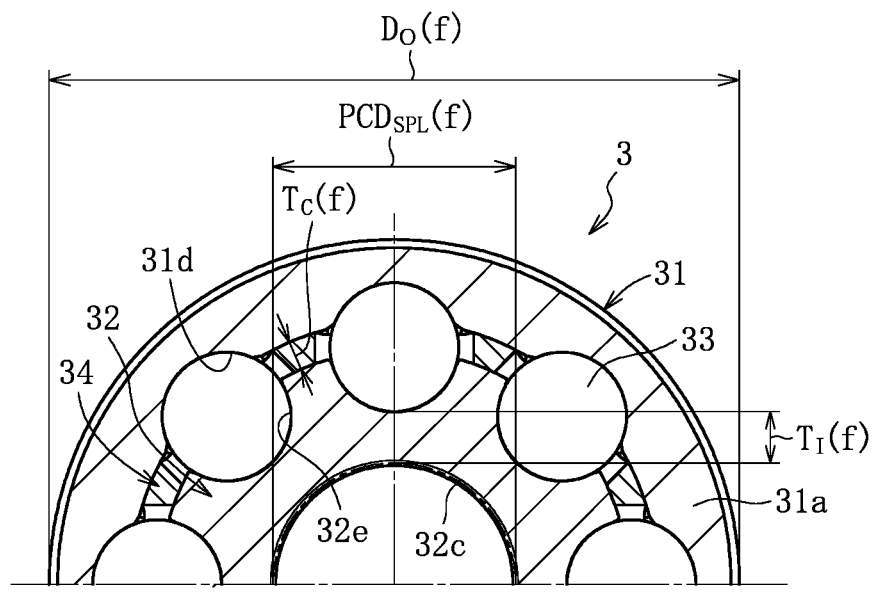
FIG. 9B2 COMPARATIVE PRODUCT
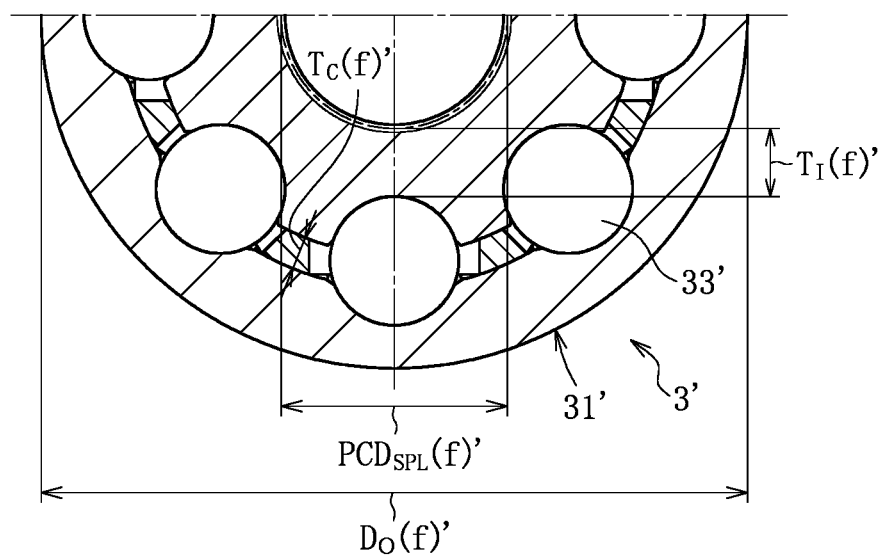

FIG. 10A
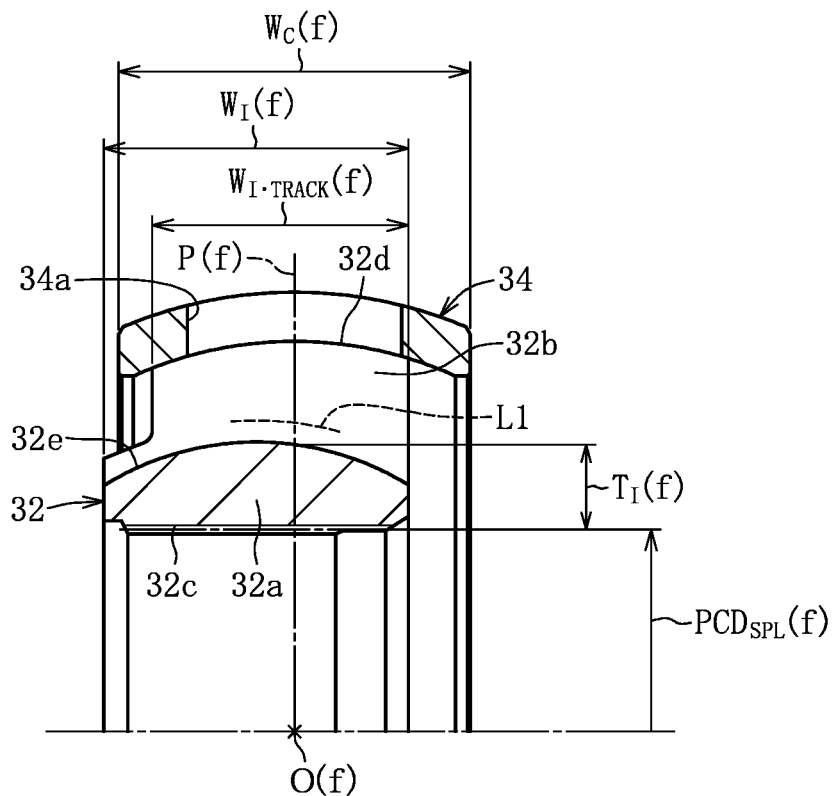
FIG. 10B COMPARATIVE PRODUCT
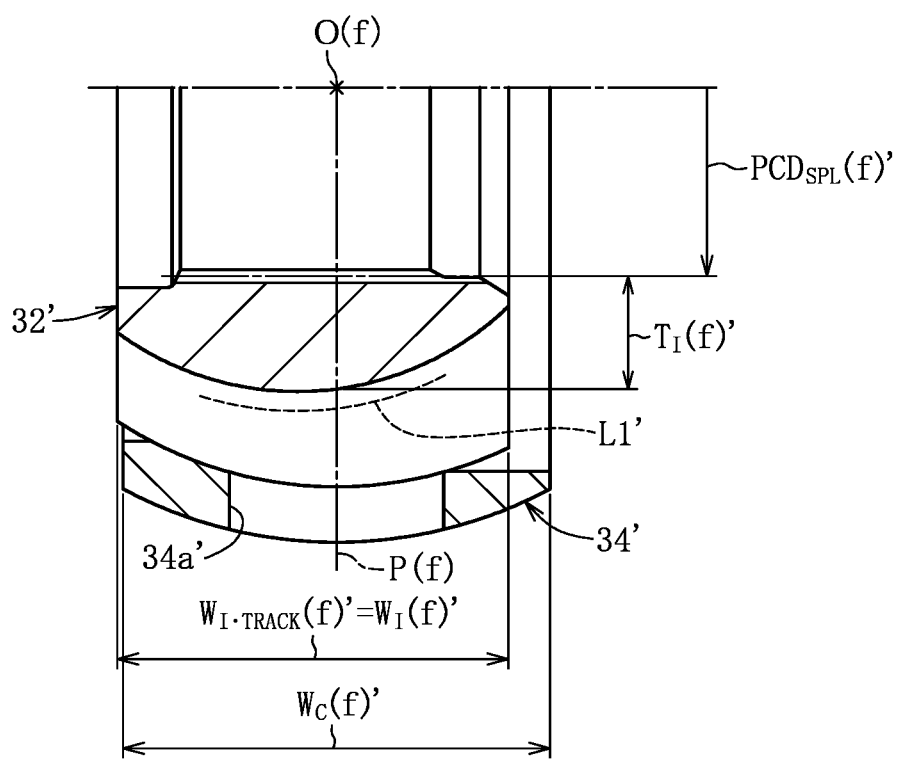

REAR-WHEEL DRIVE SHAFT

TECHNICAL FIELD

The present invention relates to a rear-wheel drive shaft to be mounted to a rear wheel of an automobile.

BACKGROUND ART

In general, a drive shaft of an automobile includes an outboard-side constant velocity universal joint mounted to a wheel, an inboard-side constant velocity universal joint mounted to a differential gear, and an intermediate shaft coupling both the constant velocity universal joints to each other. Typically, as the outboard-side constant velocity universal joint, there is used a fixed type constant velocity universal joint that can form a large operating angle but is not displaced in an axial direction thereof. Meanwhile, as the inboard-side constant velocity universal joint, there is used a plunging type constant velocity universal joint that has a relatively small maximum operating angle and can be displaced in the axial direction while forming the operating angle.

Examples of the drive shaft include a front-wheel drive shaft mounted to a front wheel, and a rear-wheel drive shaft mounted to a rear wheel. Different characteristics are demanded for a constant velocity universal joint for the front-wheel drive shaft and a constant velocity universal joint for the rear-wheel drive shaft. However, under the current circumstances, in view of, for example, mass production cost, the constant velocity universal joints having the same specifications are used for the front-wheel drive shaft and the rear-wheel drive shaft.

Meanwhile, a demand for reduction in weight of an automobile is as high as ever, and a power transmission mechanism including drive shafts is also required to achieve reduction in weight and size.

As a representative of the fixed type constant velocity universal joint to be provided to a drive shaft, a Rzeppa type constant velocity universal joint is known. In the Rzeppa type constant velocity universal joint, a curvature center of track grooves of an outer joint member and a curvature center of track grooves of an inner joint member are offset to opposite sides in an axial direction of the joint with respect to a joint center by an equal distance. With this configuration, balls are always retained within a plane obtained by bisection of an operating angle, thereby ensuring a constant velocity characteristic between the outer joint member and the inner joint member. The Rzeppa type constant velocity universal joint typically includes six torque transmission balls. In Patent Literature 1 below, a Rzeppa type constant velocity universal joint including eight torque transmission balls is disclosed. When the number of the balls is thus set to eight, reduction in weight and size can be achieved while ensuring strength, load capacity, and durability equivalent to or higher than those of the Rzeppa type constant velocity universal joint including six balls.

As a representative of the plunging type constant velocity universal joint provided to a drive shaft, a double offset constant velocity universal joint is known. In the double offset constant velocity universal joint, a curvature center of a spherical portion formed on an outer peripheral surface of a cage and a curvature center of a spherical portion formed on an inner peripheral surface of the cage are offset to opposite sides in an axial direction of the joint with respect to a joint center by an equal distance. With this configuration, balls are always retained within a plane obtained by bisection of an operating angle, thereby ensuring a constant velocity characteristic between an outer joint member and an inner joint member. The double offset constant velocity universal joint typically includes six torque transmission balls. In Patent Literature 2 below, a double offset constant velocity universal joint including eight torque transmission balls is disclosed. When the number of the balls is thus set to eight, reduction in weight and size can be achieved while ensuring strength, load capacity, and durability equivalent to or higher than those of the double offset constant velocity universal joint including six balls.

Further, in Patent Literature 3 below, a rear-wheel drive shaft is disclosed. In the rear-wheel drive shaft, a diameter of a spline formed in each end portion of a hollow intermediate shaft is increased so that the intermediate shaft has a sufficient margin of strength. Thus, reduction in thickness is possible, and hence reduction in weight of the intermediate shaft is achieved.

CITATION LIST

Patent Literature 1: JP H10-103365 A
Patent Literature 2: JP H10-73129 A
Patent Literature 3: JP 2012-97797 A

SUMMARY OF INVENTION

Technical Problem

The Rzeppa type constant velocity universal joint including the eight balls as disclosed in Patent Literature 1 above, and the double-offset constant velocity universal joint including the eight balls as disclosed in Patent Literature 2 above are put to practical use as mass-produced products. The present invention has been made through study on further reduction in weight and size of the rear-wheel drive shaft including the constant velocity universal joints of those types by achieving further reduction in weight and size of the constant velocity universal joints.

The invention proposed in Patent Literature 3 above is made to achieve reduction in weight and increase in strength of an intermediate shaft to be used for a rear-wheel drive shaft. However, in Patent Literature 3, no description is made of an object to achieve reduction in weight and size of the constant velocity universal joints provided to the rear-wheel drive shaft.

Therefore, the present invention has an object to achieve further reduction in weight and size of a rear-wheel drive shaft through study on internal specifications of constant velocity universal joints provided to the rear-wheel drive shaft.

Solution to Problem

The fixed type constant velocity universal joint provided on an outboard side of the front-wheel drive shaft has a large maximum operating angle (for example, 45° or more) because the fixed type constant velocity universal joint is mounted to a front wheel being a steered wheel. Meanwhile, the fixed type constant velocity universal joint provided on an outboard side of the rear-wheel drive shaft is mounted to a rear wheel that is not steered, and hence may have a maximum operating angle smaller than that of the fixed type constant velocity universal joint for the front-wheel drive shaft. Therefore, when the fixed type constant velocity universal joint is used exclusively for the rear-wheel drive shaft, the maximum operating angle can be reduced.

Meanwhile, a plunging type constant velocity universal joint provided on an inboard side of the drive shaft is not directly mounted to the wheel, and hence is hardly affected by a steering angle of the wheel. Accordingly, in view of, for example, mass production cost, the plunging type constant velocity universal joints having the same specifications are hitherto used for the front-wheel drive shaft and the rear-wheel drive shaft. However, the inventors of the present invention have focused on the fact that, when the plunging type constant velocity universal joint is used exclusively for the rear-wheel drive shaft, the maximum operating angle can be reduced. The reason is as follows.

That is, a large number of components are arranged at a vicinity of a front wheel of a vehicle, and hence a space is limited. Thus, for example, as illustrated in FIG. 14A, in some cases, it is inevitable that an axial center of a front wheel FW and an axial center of a differential gear G be arranged in an offset manner in a front-and-rear direction of the vehicle. In this case, in constant velocity universal joints J11 and J12 provided on a front-wheel drive shaft DS1, a normal operating angle (operating angle when an automobile runs straight at a constant speed) a in the front-and-rear direction of the vehicle is not 0°, but the constant velocity universal joints J11 and J12 always rotate under a state of forming the operating angle in the front-and-rear direction of the vehicle. Therefore, the plunging type constant velocity universal joint J12 is affected in a complex manner by the above-mentioned normal operating angle α in the front-and-rear direction of the vehicle and an operating angle in an up-and-down direction accompanied with up-and-down movement of the wheel with respect to a vehicle body. Thus, the plunging type constant velocity universal joint J12 is required to have a relatively large operating angle.

In contrast, at a vicinity of a rear wheel of the vehicle, there is a relatively sufficient margin of arrangement space for components. Thus, typically, as illustrated in FIG. 14B, an axial center of a rear wheel RW and the axial center of the differential gear G are arranged under a state of being hardly offset to each other in a front-and-rear direction of the vehicle body. In this case, the constant velocity universal joints J21 and J22 for a rear-wheel drive shaft DS2 form a normal operating angle of about 0° in the front-and-rear direction of the vehicle, and hence the plunging type constant velocity universal joint J22 to be used for the rear-wheel drive shaft DS2 may have an operating angle smaller than that of the plunging type constant velocity universal joint J12 to be used for the front-wheel drive shaft DS1. Therefore, when the plunging type constant velocity universal joint is used exclusively for the rear-wheel drive shaft, the maximum operating angle can be reduced.

As described above, in the rear-wheel drive shaft, both of the maximum operating angle of the outboard-side fixed type constant velocity universal joint and the maximum operating angle of the inboard-side plunging type constant velocity universal joint can be reduced.

Based on the knowledge described above, according to one embodiment of the present invention, there is provided a rear-wheel drive shaft, comprising: a fixed type constant velocity universal joint comprising: an outer joint member having a spherical inner peripheral surface in which eight track grooves extending in an axial direction of the fixed type constant velocity universal joint are formed; an inner joint member having a spherical outer peripheral surface in which eight track grooves extending in the axial direction are formed, and having a spline hole formed along an axial center of the inner joint member; eight balls arranged in ball tracks formed by the track grooves of the outer joint member and the track grooves of the inner joint member; and a cage, which has eight pockets configured to receive the balls, and is held in slide contact with the inner peripheral surface of the outer joint member and the outer peripheral surface of the inner joint member, a curvature center of the track grooves of the outer joint member and a curvature center of the track grooves of the inner joint member being offset to opposite sides in the axial direction with respect to a joint center by an equal distance; a plunging type constant velocity universal joint comprising: an outer joint member having a cylindrical inner peripheral surface in which eight track grooves extending in an axial direction of the plunging type constant velocity universal joint are formed; an inner joint member having a spherical outer peripheral surface in which eight track grooves extending in the axial direction are formed, and having a spline hole formed along an axial center of the inner joint member; eight balls arranged in ball tracks formed by the track grooves of the outer joint member and the track grooves of the inner joint member; and a cage, which has eight pockets configured to receive the balls, and is held in slide contact with the inner peripheral surface of the outer joint member and the outer peripheral surface of the inner joint member, a curvature center of a spherical portion formed in an outer peripheral surface of the cage and a curvature center of a spherical portion formed in an inner peripheral surface of the cage being offset to opposite sides in the axial direction with respect to a joint center by an equal distance; and an intermediate shaft comprising: an outboard-side spline to be fitted into the spline hole of the inner joint member of the fixed type constant velocity universal joint; and an inboard-side spline to be fitted into the spline hole of the inner joint member of the plunging type constant velocity universal joint, wherein a ratio $PCD_{BALL}(f)/D_{BALL}(f)$ of a pitch circle diameter $PCD_{BALL}(f)$ of the balls of the fixed type constant velocity universal joint to a diameter $D_{BALL}(f)$ of each of the balls is set from 3.70 to 3.87, and wherein a ratio $PCD_{BALL}(s)/D_{BALL}(s)$ of a pitch circle diameter $PCD_{BALL}(s)$ of the balls of the plunging type constant velocity universal joint to a diameter $D_{BALL}(s)$ of each of the balls is set from 3.3 to 3.6.

In the constant velocity universal joint, loads are applied evenly to the respective balls under a state in which an operating angle is 0°. However, when the operating angle is formed, uneven loads are applied to the respective balls, and a difference in loads applied to the respective balls becomes larger as the operating angle becomes larger. Therefore, in a case of the large operating angle, maximum loads applied to the respective balls are large, and hence members (the outer joint member, the inner joint member, and the cage) held in contact with the balls are required to have thicknesses large enough to bear the maximum loads applied from the balls. In the rear-wheel drive shaft, the maximum operating angle of the constant velocity universal joint is reduced as described above, and hence the maximum loads applied to the balls are reduced, and each component held in contact with the balls has a sufficient margin of strength. Thus, without causing reduction in load capacity and durability, a thickness of each component of the constant velocity universal joint, for example, a radial thickness of the inner joint member (specifically, a radial distance between a groove bottom of each of the track grooves of the inner joint member and a pitch circle of the spline hole) can be reduced. In this manner, the track grooves formed in the outer peripheral surface of the inner joint member can be closer to a radially inner side, and hence a pitch circle diameter of the track grooves, that is, the pitch circle diameter of the balls arranged in the track grooves can be reduced as compared to that of a conventional product (Rzeppa type constant velocity universal joint having a large operating angle, which is applicable to both the front-wheel drive shaft and the rear-wheel drive shaft).

Incidentally, the constant velocity universal joints are mass-produced products. Thus, typically, stepwise sizes are set for the constant velocity universal joints in accordance with torque load capacity, and internal specifications (for example, dimensions and shapes of components) are set for each size (a series of the constant velocity universal joints is launched). In order to achieve reduction in weight and size of the constant velocity universal joint of respective sizes, when the ball diameter is reduced, contact pressure at contact portions between the balls and the track grooves is increased, which directly causes reduction in torque load capacity. Accordingly, when study is made on design change of the constant velocity universal joint, in order to maintain torque load capacity, the ball diameter is not changed in most cases unless the number of the balls is increased. Therefore, when a dimension of each component is represented by a ratio to the ball diameter, the internal specifications of the constant velocity universal joint in accordance with torque load capacity (that is, size of the constant velocity universal joint) can be shown. As described above, the constant velocity universal joints provided to the rear-wheel drive shaft may each have a small maximum operating angle, and hence the dimension of each component with respect to the ball diameter {specifically, a ratio ($PCD_{BALL}/D_{BALL}$) of the pitch circle diameter of the balls to the ball diameter} can be reduced as compared to that of the conventional product. In this manner, there can be launched a new series of constant velocity universal joints, which are to be used exclusively for the rear-wheel drive shaft and each have a small weight and a small size.

Further, in the rear-wheel drive shaft, as described above, the maximum operating angle of the constant velocity universal joint is reduced, and hence the radial thickness of the inner joint member can be reduced. Accordingly, a diameter of the spline hole formed along the axial center of the inner joint member can be increased. In this manner, a diameter of an intermediate shaft to be inserted into the spline hole is increased, thereby improving torsional strength of the intermediate shaft. Specifically, a ratio $PCD_{SPL}(f)/D_{BALL}(f)$ of a pitch circle diameter $PCD_{SPL}(f)$ of the spline hole of the inner joint member of the fixed type constant velocity universal joint to the diameter $D_{BALL}(f)$ of each of the balls can be set from 1.82 to 1.92, and a ratio $PCD_{SPL}(s)/D_{BALL}(s)$ of a pitch circle diameter $PCD_{SPL}(s)$ of the spline hole of the inner joint member of the plunging type constant velocity universal joint to the diameter $D_{BALL}(s)$ of each of the balls can be set from 1.70 to 1.85 (preferably from 1.75 to 1.85).

In the rear-wheel drive shaft, the fixed type constant velocity universal joint and the plunging type constant velocity universal joint may each have a maximum operating angle of 20° or less.

When the intermediate shaft is hollow, further reduction in weight of the drive shaft can be achieved.

Advantageous Effects of Invention

As described above, according to the present invention, in the constant velocity universal joints provided to the rear-wheel drive shaft, through setting of the internal specifications based on a design concept different from that of the related art, reduction in weight and size of the constant velocity universal joints, and reduction in weight and size of the rear-wheel drive shaft can be achieved while maintaining torque load capacity.

BRIEF DESCRIPTION OF DRAWINGS

FIG. 5A is a longitudinal sectional view (sectional view taken along the line Y-Y of FIG. 5B) for illustrating a fixed type constant velocity universal joint incorporated into the above-mentioned rear-wheel drive shaft.

FIG. 5B is a transverse sectional view (sectional view taken along the plane including a joint center of FIG. 5A) for illustrating the above-mentioned fixed type constant velocity universal joint.

FIGS. 6A and 6B are longitudinal sectional views for illustrating the plunging type constant velocity universal joint, in which FIG. 6A is an illustration of a product of the present invention, and FIG. 6B is an illustration of a comparative product.

FIGS. 7A and 7B are transverse sectional views for illustrating the plunging type constant velocity universal joint taken along the plane including a joint center, in which FIG. 7A is an illustration of the product of the present invention, and FIG. 7B is an illustration of the comparative product.

FIGS. 8A and 8B are longitudinal sectional views for illustrating an inner joint member of the plunging type constant velocity universal joint, in which FIG. 8A is an illustration of the product of the present invention, and FIG. 8B is an illustration of the comparative product.

FIGS. 9A1 and 9A2 are longitudinal sectional views for illustrating the fixed type constant velocity universal joint, in which FIG. 9A1 is an illustration of a product of the present invention, and FIG. 9A2 is an illustration of a comparative product.

FIGS. 9B1 and 9B2 are transverse sectional views for illustrating the fixed type constant velocity universal joint taken along the plane including the joint center, in which FIG. 9B1 is an illustration of the product of the present invention, and FIG. 9B2 is an illustration of the comparative product.

FIGS. 10A and 10B are longitudinal sectional views for illustrating an inner joint member and a cage of the fixed type constant velocity universal joint, in which FIG. 10A is an illustration of the product of the present invention, and FIG. 10B is an illustration of the comparative product.

DESCRIPTION OF EMBODIMENTS

Now, an embodiment of the present invention is described with reference to the drawings.

Figure 1:
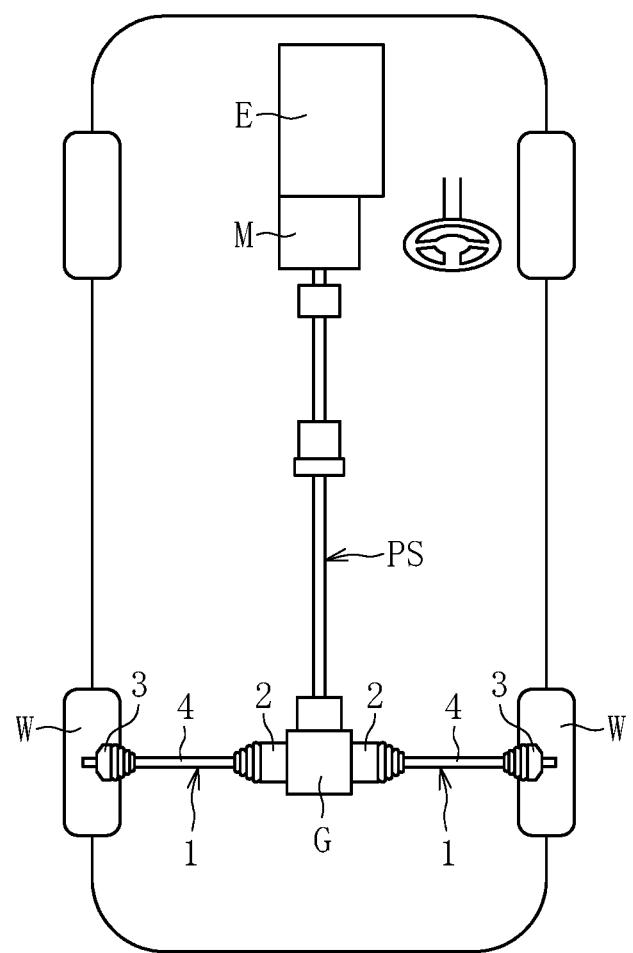
FIG. 1 is a plan view for schematically illustrating a power transmission mechanism for a rear-wheel drive vehicle.

FIG. 1 is an illustration of a power transmission mechanism for a rear-wheel drive vehicle (such as an FR vehicle) of an independent suspension type. In this power transmission mechanism, a rotational drive force output from an engine E is transmitted to a differential gear G through a transmission M and a propeller shaft PS, and then is transmitted to right and left rear wheels (wheel W) through right and left rear-wheel drive shafts 1.

Figure 2:
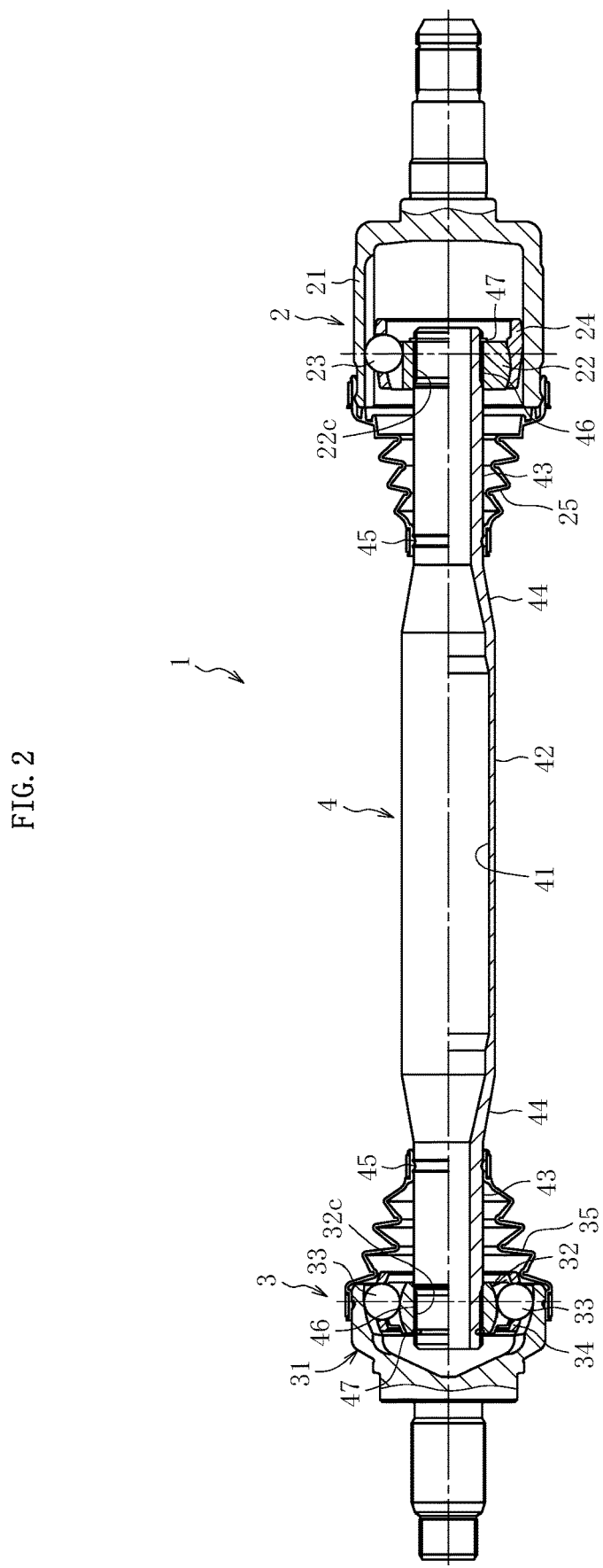
FIG. 2 is a sectional view for illustrating a rear-wheel drive shaft.

As illustrated in FIG. 2, the rear-wheel drive shaft 1 comprises a plunging type constant velocity universal joint 2, a fixed type constant velocity universal joint 3, and an intermediate shaft 4. The plunging type constant velocity universal joint 2 is provided on an inboard side (right side in FIG. 2) and is configured to allow both axial displacement and angular displacement. The fixed type constant velocity universal joint 3 is provided on an outboard side (left side in FIG. 2) and is configured to allow only angular displacement. The rear-wheel drive shaft 1 has the structure in which both the constant velocity universal joints 2 and 3 are coupled by the intermediate shaft 4. The plunging type constant velocity universal joint 2 on the inboard side is coupled to the differential gear G, and the fixed type constant velocity universal joint 3 on the outboard side is coupled to the wheel W (see FIG. 1).

Figure 3:
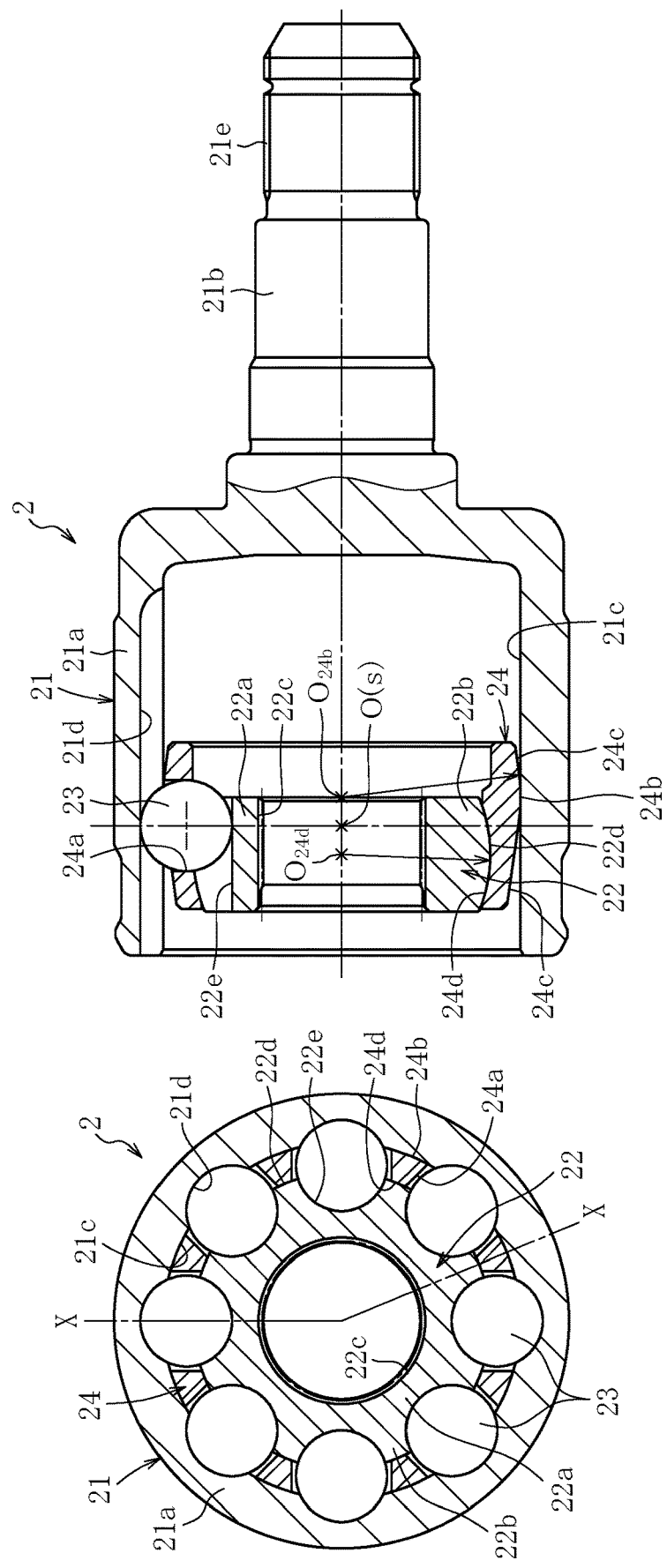
FIG. 3A is a longitudinal sectional view (sectional view taken along the line X-X of FIG. 3B) for illustrating a plunging type constant velocity universal joint incorporated into the above-mentioned rear-wheel drive shaft.
FIG. 3B is a transverse sectional view (sectional view taken along the plane including a joint center of FIG. 3A) for illustrating the above-mentioned plunging type constant velocity universal joint.

As illustrated in FIG. 3, the plunging type constant velocity universal joint 2 comprises an outer joint member 21, an inner joint member 22, eight balls 23, and a cage 24. The outer joint member 21 is mounted to the differential gear G (see FIG. 1). The inner joint member 22 is mounted to an inboard-side end portion of the intermediate shaft 4 (see FIG. 2). The eight balls 23 are configured to transmit torque between the outer joint member 21 and the inner joint member 22. The cage 24 is configured to retain the eight balls 23.

The outer joint member 21 integrally comprises a mouth section 21a and a stem section 21b. The mouth section 21a has a cup shape that is open toward one side in an axial direction of the joint (outboard side or left side in FIG. 3A). The stem section 21b extends from a bottom portion of the mouth section 21a to another side in the axial direction (inboard side or right side in FIG. 3A). Eight linear track grooves 21d extending in the axial direction are formed in a cylindrical inner peripheral surface 21c of the mouth section 21a. A spline 21e to be inserted into a spline hole of the differential gear G (see FIG. 1) is formed in an outer peripheral surface of an inboard-side end portion of the stem section 21b. The mouth section 21a and the stem section 21b may be integrally made of the same material, or may be joined to each other by, for example, welding after the mouth section 21a and the stem section 21b are formed into separate sections.

A spline hole 22c into which the intermediate shaft 4 (see FIG. 2) is to be inserted is formed along an axial center of the inner joint member 22. Eight linear track grooves 22e extending in the axial direction are formed in a spherical outer peripheral surface 22d of the inner joint member 22. That is, the inner joint member 22 integrally comprises a cylindrical portion 22a and a plurality of protruding portions 22b. The cylindrical portion 22a has the spline hole 22c. The plurality of protruding portions 22b protrude from the cylindrical portion 22a radially outward. The track grooves 22e are formed in circumferential regions between the plurality of protruding portions 22b. Radially outer surfaces of the plurality of protruding portions 22b form the spherical outer peripheral surface 22d of the inner joint member 22.

The track grooves 21d of the outer joint member 21 and the track grooves 22e of the inner joint member 22 are opposed to each other in a radial direction to form eight ball tracks, and the balls 23 are arranged one by one in the ball tracks, respectively. A transverse sectional shape of each of the track grooves 21d and 22e is an elliptic shape or a Gothic arch shape. With this configuration, the track grooves 21d and 22e and the balls 23 are held in contact with each other at a contact angle of from about 30° to about 45°, in other words, held in so-called angular contact with each other. A transverse sectional shape of each of the track grooves 21d and 22e may be an arc shape, and the track grooves 21d and 22e and the balls 23 may be held in so-called circular contact with each other.

Figure 4:
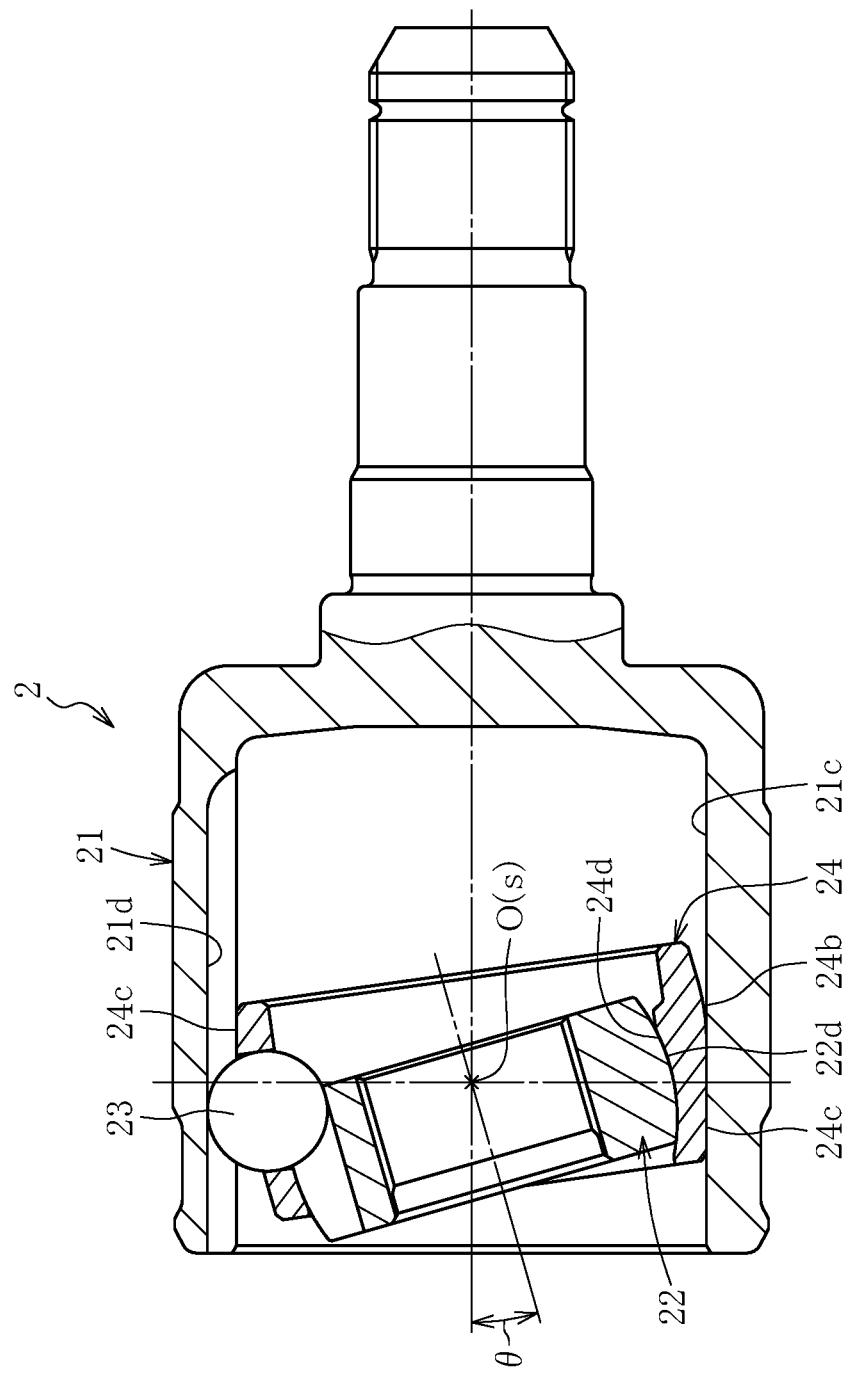
FIG. 4 is a longitudinal sectional view for illustrating a state in which the plunging type constant velocity universal joint of FIG. 3 forms a maximum operating angle.

The cage 24 has eight pockets 24a configured to retain the balls 23. All the eight pockets 24a have the same shape, and are arranged at equal intervals in a circumferential direction of the cage 24. An outer peripheral surface of the cage 24 comprises a spherical portion 24b and conical portions 24c. The spherical portion 24b is held in slide contact with the cylindrical inner peripheral surface 21c of the outer joint member 21. The conical portions 24c extend in tangential directions from both end portions of the spherical portion 24b in the axial direction. As illustrated in FIG. 4, when the plunging type constant velocity universal joint 2 forms a maximum operating angle θ, each of the conical portions 24c functions as a stopper configured to restrain further increase in operating angle through linear contact with the inner peripheral surface 21c of the outer joint member 21. An inclination angle of the conical portions 24c with respect to the axial center of the cage 24 is set to a half of a value of the maximum operating angle θ of the plunging type constant velocity universal joint 2. A spherical portion 24d is formed on the inner peripheral surface of the cage 24, and is held in slide contact with the spherical outer peripheral surface 22d of the inner joint member 22. Through axial sliding of the spherical portion 24b of the outer peripheral surface of the cage 24 and the cylindrical inner peripheral surface 21c of the outer joint member 21, axial displacement is allowed between the outer joint member 21 and the inner joint member 22.

As illustrated in FIG. 3, a curvature center $O_{24b}$ of the spherical portion 24b of the outer peripheral surface of the cage 24, and a curvature center $O_{24d}$ of the spherical portion 24d of the inner peripheral surface of the cage 24 (that is, curvature center of the spherical outer peripheral surface 22d of the inner joint member 22) are offset to opposite sides in the axial direction with respect to joint center O(s) by an equal distance. In the illustrated example, the curvature center $O_{24b}$ of the spherical portion 24b of the outer peripheral surface of the cage 24 is offset to the inboard side (joint deep side) with respect to the joint center O(s), and the curvature center $O_{24d}$ of the spherical portion 24d of the inner peripheral surface of the cage 24 is offset to the outboard side (joint opening side) with respect to the joint center O(s). With this configuration, at a freely-selected operating angle, the balls 23 retained by the cage 24 are always arranged within a plane obtained by bisection of the operating angle, thereby ensuring a constant velocity characteristic between the outer joint member 21 and the inner joint member 22.

As illustrated in FIG. 5, the fixed type constant velocity universal joint 3 comprises an outer joint member 31, an inner joint member 32, eight balls 33, and a cage 34. The outer joint member 31 is mounted to the wheel W (see FIG. 1). The inner joint member 32 is mounted to an outboard-side end portion of the intermediate shaft 4 (see FIG. 2). The eight balls 33 are configured to transmit torque between the outer joint member 31 and the inner joint member 32. The cage 34 is configured to retain the eight balls 33.

The outer joint member 31 integrally comprises a mouth section 31a and a stem section 31b. The mouth section 31a has a cup shape that is open toward one side in an axial direction of the joint (inboard side or right side in FIG. 5A). The stem section 31b extends from a bottom portion of the mouth section 31a to another side in the axial direction (outboard side or left side in FIG. 5A). Eight arc-shaped track grooves 31d extending in the axial direction are formed in a spherical inner peripheral surface 31c of the mouth section 31a. The track grooves 31d extend to an opening-side end surface of the mouth section 31a. That is, a slight chamfered portion necessary for processing is formed between the track grooves 31d and the opening-side end surface of the mouth section 31a of the outer joint member 31. However, unlike a comparative product, a tapered surface K1 (see FIG. 9A2) necessary for incorporation of the balls is not formed. Further, unlike the comparative product, a tapered surface K2 (see FIG. 9A2) configured to regulate the maximum operating angle of the fixed type constant velocity universal joint through abutment against the intermediate shaft is not formed at an opening end of the inner peripheral surface 31c of the outer joint member 31. A spline 31e to be inserted into a spline hole on the wheel W side is formed in an outer peripheral surface of the stem section 31b. The mouth section 31a and the stem section 31b may be integrally made of the same material, or may be joined to each other by, for example, welding after the mouth section 31a and the stem section 31b are formed into separate sections. Further, a through hole extending in the axial direction may be formed along the axial centers of the mouth section 31a and the stem section 31b.

A spline hole 32c into which the intermediate shaft 4 (see FIG. 2) is to be inserted is formed along an axial center of the inner joint member 32. Eight arc-shaped track grooves 32e extending in the axial direction are formed in a spherical outer peripheral surface 32d of the inner joint member 32. That is, the inner joint member 32 integrally comprises a cylindrical portion 32a and a plurality of protruding portions 32b. The cylindrical portion 32a has the spline hole 32c. The plurality of protruding portions 32b protrude from the cylindrical portion 32a radially outward. The track grooves 32e are formed in circumferential regions between the plurality of protruding portions 32b. Radially outer surfaces of the plurality of protruding portions 32b form the spherical outer peripheral surface 32d of the inner joint member 32.

The track grooves 31d of the outer joint member 31 and the track grooves 32e of the inner joint member 32 are opposed to each other in a radial direction to form eight ball tracks, and the balls 33 are arranged one by one in the ball tracks, respectively. A transverse sectional shape of each of the track grooves 31d and 32e is an elliptic shape or a Gothic arch shape. With this configuration, the track grooves 31d and 32e and the balls 33 are held in contact with each other at a contact angle of from about 30° to about 45°, in other words, held in so-called angular contact with each other. A transverse sectional shape of each of the track grooves 31d and 32e may be an arc shape, and the track grooves 31d and 32e and the balls 33 may be held in so-called circular contact with each other.

A curvature center $O_{31d}$ of the track grooves 31d of the outer joint member 31, and a curvature center $O_{32e}$ of the track grooves 32e of the inner joint member 32 are offset to opposite sides in the axial direction with respect to a joint center O(f) by an equal distance. In the illustrated example, the curvature center $O_{31d}$ of the track grooves 31d of the outer joint member 31 is offset to the inboard side (joint opening side) with respect to the joint center O(f), and the curvature center $O_{32e}$ of the track grooves 32e of the inner joint member 32 is offset to the outboard side (joint deep side) with respect to the joint center O(f). With this configuration, at a freely-selected operating angle, the balls 33 retained by the cage 34 are always arranged within a plane obtained by bisection of the operating angle, thereby ensuring a constant velocity characteristic between the outer joint member 31 and the inner joint member 32.

The cage 34 has eight pockets 34a configured to retain the balls 33. All the eight pockets 34a have the same shape, and are arranged at equal intervals in a circumferential direction of the cage 34. A spherical outer peripheral surface 34b of the cage 34 is held in slide contact with the spherical inner peripheral surface 31c of the outer joint member 31. A spherical inner peripheral surface 34c of the cage 34 is held in slide contact with the spherical outer peripheral surface 32d of the inner joint member 32. A curvature center of the outer peripheral surface 34b of the cage 34 (that is, curvature center of the spherical inner peripheral surface 31c of the outer joint member 31), and a curvature center of the inner peripheral surface 34c (that is, curvature center of the spherical outer peripheral surface 32d of the inner joint member 32) match with the joint center O(f).

As illustrated in FIG. 2, as the intermediate shaft 4, a hollow shaft having a through hole 41 extending in the axial direction can be used. The intermediate shaft 4 comprises a large-diameter portion 42, small-diameter portions 43, and tapered portions 44. The large-diameter portion 42 is formed at a center of the intermediate shaft 4 in the axial direction. The small-diameter portions 43 are formed at both ends of the intermediate shaft 4 in the axial direction, respectively. Each of the tapered portions 44 connects the large-diameter portion 42 and the small-diameter portion 43. An annular groove 45 for mounting a boot and a spline 46 are formed in the small-diameter portion 43 of the intermediate shaft 4. The small-diameter portion 43 has a constant outer diameter except for the annular groove 45 and the spline 46. The intermediate shaft 4 is not limited to the hollow shaft, and a solid shaft may also be used.

The spline 46 at an inboard-side end portion of the intermediate shaft 4 is press-fitted into the spline hole 22c of the inner joint member 22 of the plunging type constant velocity universal joint 2. Thus, the intermediate shaft 4 and the inner joint member 22 are coupled to each other in a torque transmittable manner through spline fitting. An annular recessed groove is formed in the inboard-side end portion of the intermediate shaft 4, and a snap ring 47 is fitted into the recessed groove. Through engagement of the snap ring 47 from the inboard side (shaft end side) of the inner joint member 22, the intermediate shaft 4 and the inner joint member 22 are prevented from coming off. Further, a bellows-shaped boot 25 is mounted and fixed to the outer peripheral surface of the outer joint member 21 of the plunging type constant velocity universal joint 2 and the outer peripheral surface of the intermediate shaft 4 by boot bands (not shown). Grease being a lubricant is sealed in an interior (space sealed by the outer joint member 21 and the boot 25) of the joint.

The spline 46 at an outboard-side end portion of the intermediate shaft 4 is press-fitted into the spline hole 32c of the inner joint member 32 of the fixed type constant velocity universal joint 3. Thus, the intermediate shaft 4 and the inner joint member 32 are coupled to each other in a torque transmittable manner through spline fitting. An annular recessed groove is formed in the outboard-side end portion of the intermediate shaft 4, and a snap ring 47 is fitted into the recessed groove. Through engagement of the snap ring 47 from the outboard side (shaft end side) of the inner joint member 32, the intermediate shaft 4 and the inner joint member 32 are prevented from coming off. Further, a bellows-shaped boot 35 is mounted and fixed to the outer peripheral surface of the outer joint member 31 of the fixed type constant velocity universal joint 3 and the outer peripheral surface of the intermediate shaft 4 by boot bands (not shown). Grease being a lubricant is sealed in an interior (space sealed by the outer joint member 31 and the boot 35) of the joint.

The plunging type constant velocity universal joint 2 and the fixed type constant velocity universal joint 3 described above are used exclusively for the rear-wheel drive shaft, and hence the maximum operating angle can be set smaller than that of a conventional product that is also usable for a front-wheel drive shaft. In this embodiment, both of the maximum operating angle of the plunging type constant velocity universal joint 2 and the maximum operating angle of the fixed type constant velocity universal joint 3 are set to 20° or less. In this manner, reduction in weight and size of the plunging type constant velocity universal joint 2 and the fixed type constant velocity universal joint 3 can be achieved while maintaining load capacity. In the following, internal specifications of the plunging type constant velocity universal joint 2 and the fixed type constant velocity universal joint 3 are described in detail.

[Internal Specifications of Plunging Type Constant Velocity Universal Joint]

Figure 6A:
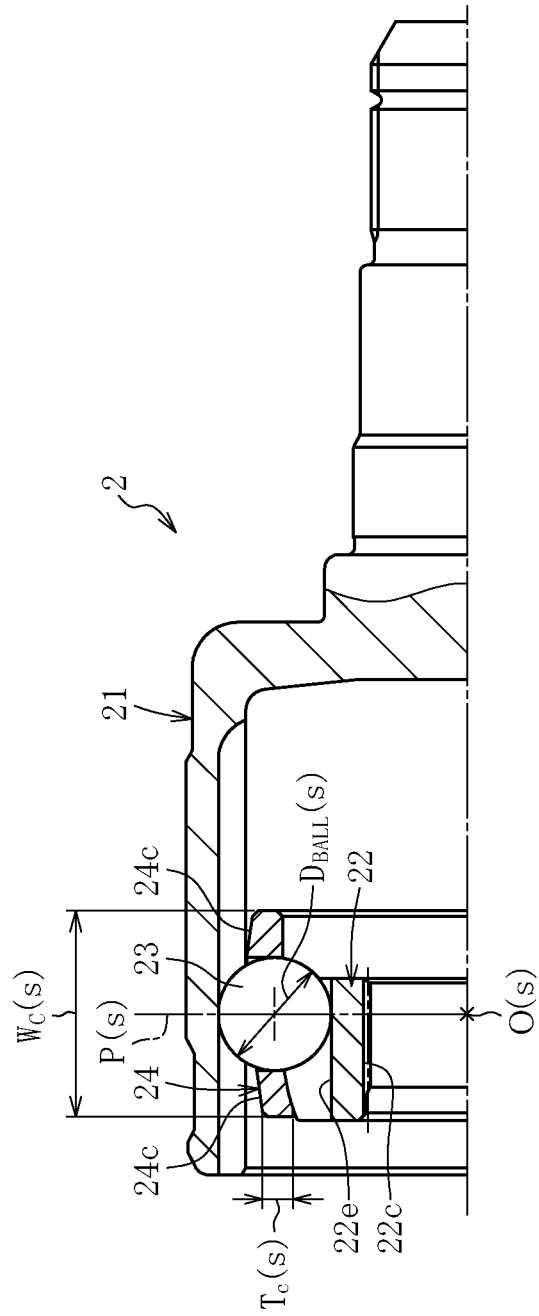

In Table 1 below and FIG. 6A to FIG. 8B, the internal specifications of the plunging type constant velocity universal joint 2 being the product of the present invention are shown and illustrated in comparison to a comparative product (double offset constant velocity universal joint having a maximum operating angle of 25° and eight balls) having the same ball diameter as that of the product of the present invention. Each of FIGS. 6A, 7A and 8A is a sectional view of the plunging type constant velocity universal joint 2 being the product of the present invention, and each of FIGS. 6B, 7B and 8B is a sectional view of a plunging type constant velocity universal joint 2' being the comparative product. Each component of the comparative product is denoted by the reference symbol obtained by adding a prime (') to the reference symbol of each component of the product of the present invention.

TABLE 1

|  | Product of the present invention | Comparative product |
|---|---|---|
| (1) Ball PCD {PCD$_{BALL}$(s)}/ball diameter | 3.3 to 3.6 | 3.6 to 3.9 |
| (2) Inner ring width {W$_I$(s)}/ball diameter | 1.2 to 1.55 | 1.6 to 1.8 |
| (3) Inner ring thickness {T$_I$(s)}/ball diameter | 0.30 to 0.45 | 0.45 to 0.60 |
| (4) Spline PCD {PCD$_{SPL}$(s)}/ball diameter | 1.70 to 1.85 | 1.65 to 1.75 |
| (5) Outer-ring outer diameter {D$_O$(s)}/spline PCD {PCD$_{SPL}$(s)} | 2.7 to 3.0 | 3.0 to 3.3 |
| (6) Cage width {W$_C$(s)}/ball diameter | 1.8 to 2.0 | 2.0 to 2.2 |

Parameters described above are defined as follows.

(1) Ball PCD (pitch circle diameter of the balls) PCD$_{BALL}$(s): The ball PCD has a value twice as large as a distance between the axial center of the outer joint member 21 and a center of the ball 23 or between the axial center of the inner joint member 22 and the center of the ball 23. That is, the ball PCD corresponds to a diameter of a circle passing centers of all of the balls 23 under a state in which the operating angle is 0°.

(2) Inner ring width (axial width of the inner joint member) W$_I$(s): The inner ring width is a maximum axial dimension of the inner joint member 22. In the illustrated example, the inner ring width is an axial distance between both end surfaces of the inner joint member 22.

(3) Inner ring thickness (radial thickness of the inner joint member) T$_I$(s): The inner ring thickness is a radial distance between a groove bottom of the track groove 22e in a joint center plane P {plane that passes the joint center O(s) and is orthogonal to an axis} and a pitch circle of the spline hole 22c. In the illustrated example, the inner joint member has a constant radial thickness in the axial direction.

(4) Spline PCD (pitch circle diameter of the spline hole of the inner joint member) PCD$_{SPL}$(s): The spline PCD is a diameter of a pitch circle of meshing between the spline hole 22c of the inner joint member 22 and the spline 46 (see FIG. 2) of the intermediate shaft 4.

(5) Outer-ring outer diameter D$_O$(s): The outer-ring outer diameter is a maximum outer diameter of the outer joint member 21.

(6) Cage width W$_C$(s): The cage width is a maximum axial dimension of the cage 24. In the illustrated example, the cage width is an axial distance between both end surfaces of the cage 24.

In the following, detailed description is made of a design concept leading to the above-mentioned internal specifications.

In the plunging type constant velocity universal joint 2, as the operating angle is increased, a maximum load applied to each of the balls 23 is increased. Accordingly, when the maximum operating angle is reduced as described above, the maximum load applied to each of the balls 23 is reduced. Accordingly, the inner joint member 22 held in contact with the balls 23 has a sufficient margin of strength, and thus the radial thickness of the inner joint member 22 can be reduced, thereby being capable of reducing a diameter of the outer peripheral surface of the inner joint member 22. In this manner, the track grooves 22e formed in the outer peripheral surface of the inner joint member 22 can be closer to a radially inner side, and hence a pitch circle diameter of the track grooves 22e of the inner joint member 22, that is, the pitch circle diameter of the balls 23 arranged in the track grooves 22e can be reduced as compared to that of the comparative product $\{PCD_{BALL}(s) < PCD_{BALL}(s)'$, see the row (1) in Table 1 above$\}$. Thus, without causing reduction in load capacity and durability, a size of the plunging type constant velocity universal joint 2 in the radial direction can be reduced, and hence reduction in weight can be achieved.

The comparative product has a large maximum operating angle, and hence a circumferential length of each of pockets 24a' of a cage 24' is increased. Thus, it has been required to increase a diameter of the cage 24' in order to ensure the circumferential length of each of the pockets 24a'. Therefore, a diameter of an outer peripheral surface of an inner joint member 22' to be held in slide contact with an inner peripheral surface of the cage 24' is increased. Consequently, the inner joint member 22' has an excessively large thickness that is more than necessary in view of strength. In contrast, in the product of the present invention, when the maximum operating angle is reduced as described above, a movement amount of each of the balls 23 in the circumferential direction with respect to the cage 24 is reduced, thereby being capable of reducing the circumferential dimension of each of the pockets 24a of the cage 24 (Lp<Lp'). Accordingly, while maintaining the circumferential dimension of a pillar portion 24e between the pockets 24a (Lc≈Lc'), the diameter of the cage 24 can be reduced, and the diameter of the outer peripheral surface 22d of the inner joint member 22 to be held in slide contact with the spherical portion 24d of the inner peripheral surface of the cage 24 can be reduced (see FIG. 7A). As a result, a thickness of the inner joint member 22 can be reduced so as to be set to a minimum thickness necessary in view of strength $\{T_f(s) < T_f(s)'$, see the row (3) in Table 1 above$\}$. Further, the pitch circle diameter of the balls 23 is reduced as described above, thereby being capable of reducing a size of the plunging type constant velocity universal joint 2 in the radial direction.

Through reduction of the maximum operating angle of the plunging type constant velocity universal joint 2, the maximum load applied to each of the balls 23 is reduced as described above, with the result that the cage 24 held in contact with the balls 23 has a sufficient margin of strength. Accordingly, an axial thickness of an annular portion formed at each end of the cage 24 in the axial direction can be reduced while maintaining durability equivalent to that of the comparative product. Thus, an axial width of the entire cage 24 can be reduced, and hence reduction in weight can be achieved $\{W_C(s) < W_C(s)'$, see the row (6) in Table 1 above$\}$.

Through reduction of the maximum operating angle of the plunging type constant velocity universal joint 2, an angle of the conical portions 24c of the outer peripheral surface of the cage 24 with respect to the axial center can be reduced, and can be set to 10° or less in this embodiment. With this configuration, a thickness (for example, a thickness $T_C(s)$ at a joint-opening-side end portion) of a thin portion of the cage 24 can be increased, and hence strength of the cage 24 can be increased.

When the maximum operating angle of the plunging type constant velocity universal joint 2 is reduced, the radial thickness $T_f(s)$ of the inner joint member 22 can be reduced as described above, with the result that a diameter of the spline hole 22c of the inner joint member 22 can be increased $\{PCD_{SPL}(s) > PCD_{SPL}(s)'$, see the row (4) in Table 1 above$\}$. In this manner, the intermediate shaft 4 to be inserted into the spline hole 22c is increased in diameter, and thus torsional strength can be enhanced. Further, when the maximum operating angle of the plunging type constant velocity universal joint 2 is reduced, the pitch circle diameter of the balls 23 can be reduced as described above, with the result that a diameter of the outer joint member 21 can be reduced. From the above description, in the product of the present invention, a ratio $D_O(s)/PCD_{SPL}(s)$ of the outer diameter $D_O(s)$ of the outer joint member 21 to the pitch circle diameter $PCD_{SPL}(s)$ of the spline hole 22c of the inner joint member 22 can be set smaller than that of the comparative product $\{D_O(s)/PCD_{SPL}(s) < D_O(s)'/PCD_{SPL}(s)'$, see the row (5) in Table 1 above$\}$. In this manner, reduction in weight and size of the plunging type constant velocity universal joint 2, and improvement in strength of the intermediate shaft 4 can be achieved at the same time.

When the maximum operating angle of the plunging type constant velocity universal joint 2 is reduced, a movement amount of each of the balls 23 in the axial direction with respect to the inner joint member 22 is reduced. Specifically, as illustrated in FIG. 8A, an axial length (track effective length) of a locus of a contact point between the track groove 22e of the inner joint member 22 and the ball 23 is smaller in the product of the present invention having a small maximum operating angle than in the comparative product having a large maximum operating angle ($Z_I < Z_I'$). With this configuration, in the product of the present invention, the axial length of each of the track grooves 22e of the inner joint member 22 and the axial width of the entire inner joint member 22 can be reduced as compared to those of the comparative product $\{W_f(s) < W_f(s)'$, see the row (2) in Table 1 above$\}$.

However, when the axial width of the inner joint member 22 is excessively small, the spline hole 22c formed along the axial center of the inner joint member 22 has an insufficient axial length, which may lead to insufficient strength of a spline fitting portion between the inner joint member 22 and the intermediate shaft 4. In the plunging type constant velocity universal joint 2 being the product of the present invention, through reduction of the maximum operating angle, the radial thickness of the inner joint member 22 can be reduced as described above, and hence a diameter of the spline hole 22c of the inner joint member 22 can be increased. Accordingly, while maintaining the contact pressure for each spline tooth (that is, while maintaining strength of the spline fitting portion), the axial length of the spline hole 22c of the inner joint member 22 can be reduced. In the above-mentioned manner, through reduction of the axial length of each of the track grooves 22e of the inner joint member 22 and the axial length of the spline hole 22c, the axial width of the entire inner joint member 22 can be reduced as described above, and hence reduction in weight can be achieved.

As described above, in consideration of various conditions obtained by reducing the maximum operating angle of the plunging type constant velocity universal joint, study is made on the internal specifications of the plunging type constant velocity universal joint, thereby being capable of reducing the weight and size of the plunging type constant velocity universal joint while maintaining torque load capacity equivalent to that of the comparative product. Thus, there can be launched a new series of plunging type constant velocity universal joints each having a small weight and a small size and being usable exclusively for the rear-wheel drive shaft.

[Internal Specifications of Fixed Type Constant Velocity Universal Joint]

In Table 2 below and FIG. 9A1 to FIG. 10B, the internal specifications of the fixed type constant velocity universal joint 3 being the product of the present invention are shown and illustrated in comparison to a comparative product (Rzeppa type constant velocity universal joint having a maximum operating angle of 47° and eight balls) having the same ball diameter as that of the product of the present invention. Each of FIGS. 9A1, 9B1 and 10A is a sectional view of the fixed type constant velocity universal joint 3 being the product of the present invention, and each of FIGS. 9A2, 9B2 and 10B is a sectional view of a fixed type constant velocity universal joint 3' being the comparative product. Each component of the comparative product is denoted by the reference symbol obtained by adding a prime (') to the reference symbol of each component of the product of the present invention.

TABLE 2

|  | Product of the present invention | Comparative product |
|---|---|---|
| (1) Ball PCD {PCD$_{BALL}$(f)}/ball diameter | 3.70 to 3.87 | 3.81 to 3.98 |
| (2) Inner ring track length {W$_{I-TRACK}$(f)}/ball diameter | 1.1 to 1.3 | 1.8 to 1.9 |
| (3) Inner ring width {W$_I$(f)}/ball diameter | 1.40 to 1.55 | 1.8 to 1.9 |
| (4) Inner ring thickness {T$_I$(f)}/ball diameter | 0.40 to 0.51 | 0.52 to 0.59 |
| (5) Spline PCD{PCD$_{SPL}$(f)}/ball diameter | 1.82 to 1.92 | 1.72 to 1.82 |
| (6) Outer-ring outer diameter {D$_O$(f)}/spline PCD {PCD$_{SPL}$(f)} | 2.9 to 3.0 | 3.1 to 3.3 |
| (7) Length {W1$_O$(f)} between joint center and outer-ring opening end surface/ball diameter | 0.35 to 0.52 | 1.1 to 1.2 |
| (8) Cage thickness {T$_C$(f)}/ball diameter | 0.22 to 0.25 | 0.25 to 0.28 |
| (9) Cage width {W$_C$(f)}/ball diameter | 1.63 to 1.80 | 1.85 to 2.02 |

Parameters are defined as follows.

(1) Ball PCD (pitch circle diameter of the balls) PCD$_{BALL}$(f): The ball PCD has a value twice as large as a length of a line segment connecting a center of the ball 33 to the curvature center O$_{31d}$ of the track grooves 31d of the outer joint member 31 or the curvature center O$_{32e}$ of the track grooves 32e of the inner joint member 32 (A length of a line segment connecting the center of the ball 33 to the curvature center O$_{31d}$ of the track grooves 31d of the outer joint member 31 and a length of a line segment connecting the center of the ball 33 to the curvature center O$_{32e}$ of the track grooves 32e of the inner joint member 32 are equal. A dimension of the line segments is represented by PCR.) (PCD$_{BALL}$(f)=2×PCR).

(2) Inner ring track length (axial length of the track groove of the inner joint member) W$_{I-TRACK}$(f): Strictly speaking, the inner ring track length is an axial length of a locus of a contact point between the track groove 32e of the inner joint member 32 and the ball 33. However, in Description, the inner ring track length refers to an axial length of the spherical outer peripheral surface 32d of the inner joint member 32, that is, an axial distance between both end surfaces of the inner joint member 32 in the axial direction (an axial distance between end surfaces extending radially inward from both ends of the outer peripheral surface 32d in the axial direction).

(3) Inner ring width (axial width of the inner joint member) W$_I$(f): The inner ring width is a maximum axial dimension of the inner joint member 32. In the illustrated example, the inner ring width is an axial distance between both end surfaces of the cylindrical portion 32a of the inner joint member 32.

(4) Inner ring thickness (radial thickness of the inner joint member) T$_I$(f): The inner ring thickness is a radial distance between a groove bottom of the track groove 32e in a joint center plane P (f) (plane that passes the joint center O(f) and is orthogonal to an axis) and a pitch circle of the spline hole 32c.

(5) Spline PCD (pitch circle diameter of the spline hole of the inner joint member) PCD$_{SPL}$(f): The spline PCD is a diameter of a pitch circle of meshing between the spline hole 32c of the inner joint member 32 and the spline 46 of the intermediate shaft 4.

(6) Outer-ring outer diameter D$_O$(f): The outer-ring outer diameter is a maximum outer diameter of the outer joint member 31.

(7) Length W1$_O$(f) between the joint center and an outer-ring opening end surface: The length is an axial distance between the joint center O(f) and the opening-side end surface (inboard-side end surface) of the mouth section 31a of the outer joint member 31.

(8) Cage thickness T$_C$(f): The cage thickness is a radial thickness of the cage 34 in the joint center plane P(f).

(9) Cage width W$_C$(f): The cage width is a maximum axial dimension of the cage 34. In the illustrated example, the cage width is an axial distance between both end surfaces of the cage 34.

In the following, detailed description is made of a design concept leading to the above-mentioned internal specifications.

In the fixed type constant velocity universal joint 3, as the operating angle is increased, a maximum load applied to each of the balls 33 is increased. Accordingly, when the maximum operating angle is reduced as described above, the maximum load applied to each of the balls 33 is reduced. Thus, the inner joint member 32 to be held in contact with the balls 33 has a sufficient margin of strength. As a result, the radial thickness of the inner joint member 32 can be reduced while maintaining durability equivalent to that of the comparative product {T$_I$(f)<T$_I$(f)', see the row (4) in Table 2 above}. With this configuration, a diameter of the outer peripheral surface of the inner joint member 32 can be reduced, and hence the track grooves 32e formed in the outer peripheral surface of the inner joint member 32 can be closer to the radially inner side. As a result, a pitch circle diameter of the track grooves 32e of the inner joint member 32, that is, the pitch circle diameter of the balls 33 arranged in the track grooves 32e can be reduced as compared to that of the comparative product {$PCD_{BALL}(f) < PCD_{BALL}(f)'$, see the row (1) in Table 2 above}. Thus, without causing reduction in load capacity and durability, a size of the fixed type constant velocity universal joint 3 in the radial direction can be reduced, and hence reduction in weight can be achieved.

Figure 13A:
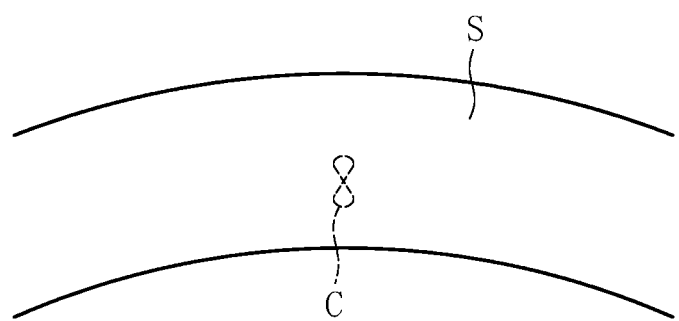
FIG. 13A is a view for illustrating a locus of a contact point between a pocket surface of the cage and a ball of the product of the present invention.
Figure 13B:
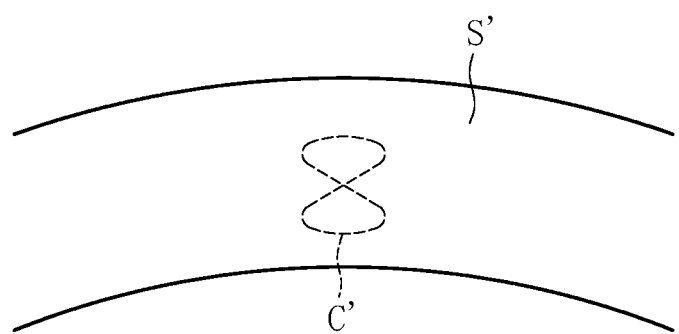
FIG. 13B is a view for illustrating a locus of a contact point between the pocket surface of the cage and the ball of the comparative product.
Figure 14A:
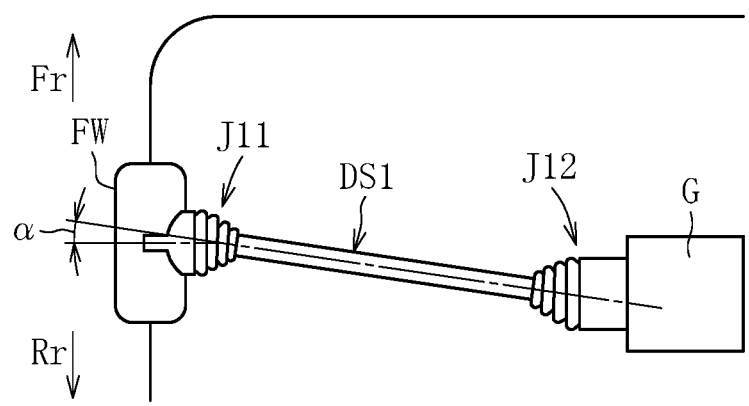
FIG. 14A is a plan view for illustrating a state in which a front-wheel drive shaft is mounted so as to be inclined with respect to a vehicle width direction.
Figure 14B:
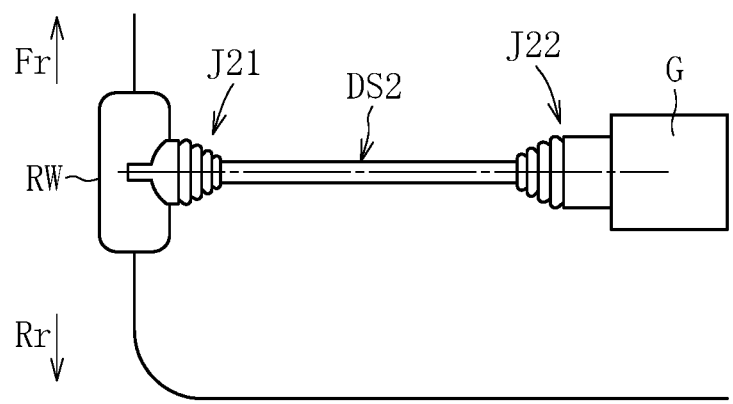
FIG. 14B is a plan view for illustrating a state in which a rear-wheel drive shaft is mounted so as to be parallel to the vehicle width direction.

Through reduction of the maximum operating angle of the fixed type constant velocity universal joint 3, the maximum load applied to each of the balls 33 is reduced so that the cage 34 held in contact with the balls 33 has a sufficient margin of strength. Accordingly, the radial thickness of the cage 34 can be reduced while maintaining durability equivalent to that of the comparative product {$T_C(f) < T_C(f)'$, see the row (8) in Table 2 above}. Further, as is apparent from a locus C of a contact point between a pocket surface S of the cage and the ball of the product of the present invention (having a maximum operating angle of 20°) illustrated in FIG. 13A, and a locus C' of a contact point between a pocket surface S' of the cage and the ball of the comparative product (having a maximum operating angle of 47°) illustrated in FIG. 13B, when the maximum operating angle of the fixed type constant velocity universal joint 3 is reduced, a movement amount of the ball 33 in the radial direction (up-and-down direction of FIG. 13) in a pocket 34a of the cage 34 is reduced. Also from this point of view, the radial thickness of the cage 34 can be reduced. As described above, the thickness $T_C(f)$ of the cage 34 is reduced, and the pitch circle diameter $PCD_{BALL}(f)$ of the balls 33 is reduced at the same time. Thus, while depths of the track grooves 31d of the outer joint member 31 and depths of the track grooves 32e of the inner joint member 32 are ensured so as to prevent the balls 33 from climbing on edge portions of the track grooves, reduction in weight and size of the fixed type constant velocity universal joint 3 can be achieved.

When the maximum operating angle of the fixed type constant velocity universal joint 3 is reduced, the radial thickness $T_I(f)$ of the inner joint member 32 can be reduced as described above, with the result that a diameter of the spline hole 32c of the inner joint member 32 can be increased {$PCD_{SPL}(f) > PCD_{SPL}(f)'$, see the row (5) in Table 2 above}. In this manner, the intermediate shaft 4 (see FIG. 4) to be inserted into the spline hole 32c is increased in diameter, and thus torsional strength can be enhanced. Further, when the maximum operating angle of the fixed type constant velocity universal joint 3 is reduced, the pitch circle diameter of the balls 33 can be reduced as described above, with the result that a diameter of the outer joint member 31 can be reduced. From the above description, in the product of the present invention, a ratio $D_O(f)/PCD_{SPL}(f)$ of the outer diameter $D_O(f)$ of the outer joint member 31 to the pitch circle diameter $PCD_{SPL}(f)$ of the spline hole 32c of the inner joint member 32 can be set smaller than that of the comparative product {$D_O(f)/PCD_{SPL}(f) < D_O(f)'/PCD_{SPL}(f)'$, see the row (6) in Table 2 above}. In this manner, reduction in weight and size of the fixed type constant velocity universal joint 3, and improvement in strength of the intermediate shaft 4 (see FIG. 2) can be achieved at the same time.

Figure 11:
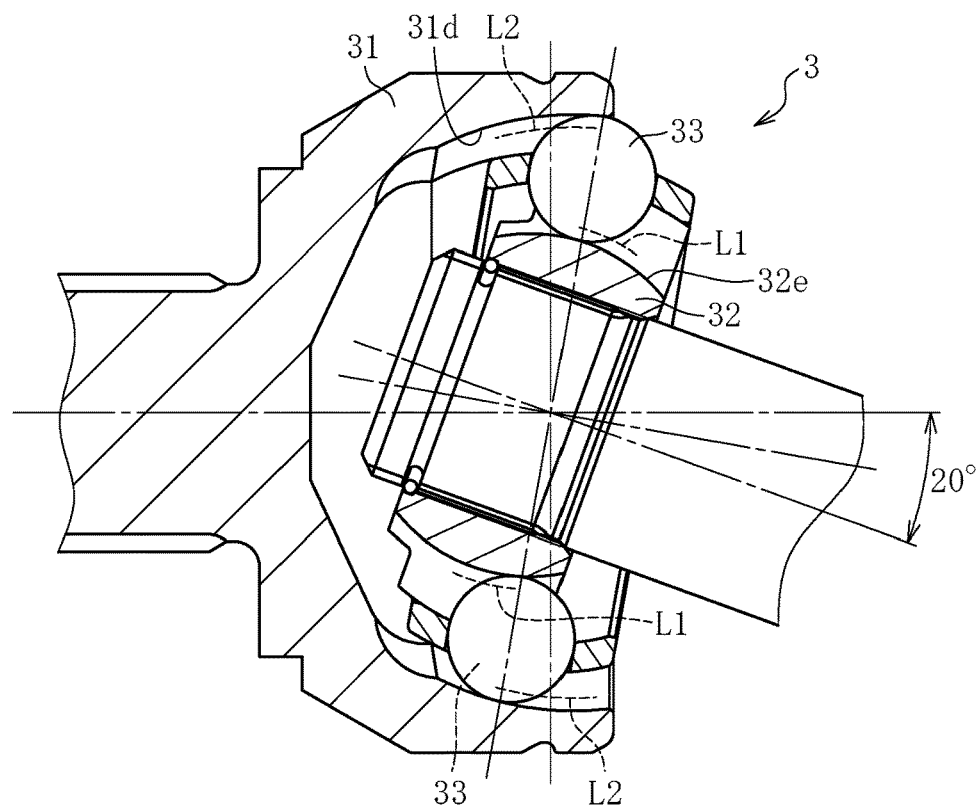
FIG. 11 is a sectional view for illustrating a state in which the fixed type constant velocity universal joint being the product of the present invention forms a maximum operating angle (20°).
Figure 12:
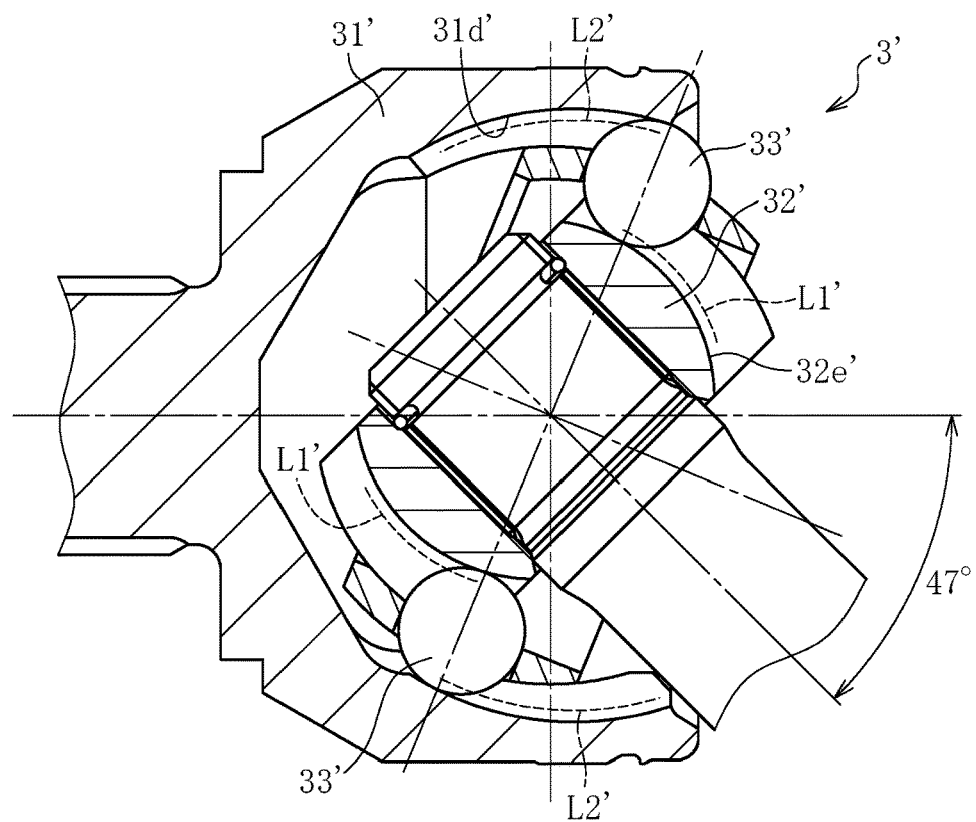
FIG. 12 is a sectional view for illustrating a state in which the fixed type constant velocity universal joint being the comparative product forms a maximum operating angle (47°).

FIG. 11 is an illustration of a state in which the fixed type constant velocity universal joint 3 being the product of the present invention forms a maximum operating angle (20°). FIG. 12 is an illustration of a state in which the fixed type constant velocity universal joint 3' being the comparative product forms a maximum operating angle (47°). As is apparent from FIG. 7A to 8B, a length of a locus L1 of a contact point between the track groove 32e of the inner joint member 32 and the ball 33 in the product of the present invention is smaller than a length of a locus L1' of a contact point between the track groove 32e' of the inner joint member 32' and the ball 33' in the comparative product. When the maximum operating angle of the fixed type constant velocity universal joint 3 is thus reduced, a movement amount of the ball 33 in the axial direction is reduced. As a result, as illustrated in FIG. 10A, the axial length of the track groove 32e of the inner joint member 32 can be reduced {$W_{I-TRACK}(f) < W_{I-TRACK}(f)'$, see the row (2) in Table 2 above}. With this configuration, the axial width $W_I(f)$ of the entire inner joint member 32 can be reduced, and hence reduction in weight can be achieved {$W_I(f) < W_I(f)'$, see the row (3) in Table 2 above}.

Further, when the diameter of the spline hole 32c of the inner joint member 32 is increased as described above, a pitch circle diameter of a fitting portion between the spline hole 32c of the inner joint member 32 and the spline 46 of the intermediate shaft 4 (see FIG. 2) is increased, with the result that contact pressure at a contact portion between spline teeth is reduced. Thus, while maintaining the contact pressure for each spline tooth, the axial length of the spline hole 32c of the inner joint member 32 can be reduced. Accordingly, the axial width of the cylindrical portion 32a of the inner joint member 32 can be reduced. In this manner, not only the axial length of each of the track grooves 32e of the inner joint member 32 but also the axial length of the spline hole 32c is reduced, thereby being capable of reducing the axial width of the entire inner joint member 32 as described above.

Further, as illustrated in FIG. 11 and FIG. 12, a length of a locus L2 of a contact point between the track groove 31d of the outer joint member 31 and the ball 33 in the product of the present invention is smaller than a length of a locus L2' of a contact point between the track groove 31d' of the outer joint member 31' and the ball 33' in the comparative product. When the maximum operating angle of the fixed type constant velocity universal joint 3 is thus reduced, a movement amount of the ball 33 in the axial direction with respect to the outer joint member 31 is reduced. As a result, as illustrated in FIGS. 9A1 and 9B1, an axial length of the track groove 31d of the outer joint member 31, in particular, an axial length of a portion of the track groove 31d on an opening side with respect to the joint center O(f), specifically, an axial length from the joint center O(f) to the opening-side end surface of the mouth section 31a of the outer joint member 31 can be reduced {$W1_O(f) < W1_O(f)'$, see the row (7) in Table 2 above}. In this manner, a size of the outer joint member 31 in the axial direction is reduced, and thus reduction in weight can be achieved.

When the maximum operating angle of the fixed type constant velocity universal joint 3 is reduced, the cage 34 has a sufficient margin of strength as described above. Accordingly, the axial width of the cage 34 can be reduced while maintaining durability equivalent to that of the comparative product {$WC(f) < WC(f)'$, see the row (9) in Table 2 above}. In this manner, a size of the cage 34 in the axial direction is reduced, and thus reduction in weight can be achieved.

As described above, in consideration of various conditions obtained by reducing the maximum operating angle of the fixed type constant velocity universal joint, study is made on the internal specifications of the fixed type constant velocity universal joint, thereby being capable of reducing the weight and size of the fixed type constant velocity universal joint while maintaining torque load capacity equivalent to that of the comparative product. Thus, there can be launched a new series of fixed type constant velocity universal joints each having a small weight and a small size and being usable exclusively for the rear-wheel drive shaft.

As described above, the rear-wheel drive shaft 1 according to this embodiment comprises the plunging type constant velocity universal joint 2 and the fixed type constant velocity universal joint 3 that are reduced in weight and size. Thus, reduction in weight and size of the entire rear-wheel drive shaft 1 can be achieved.

The present invention is not limited to the above-mentioned embodiment. For example, the above-mentioned rear-wheel drive shaft is usable not only for a rear-wheel drive vehicle (such as an FR vehicle) that drives only rear wheels, but also for a four-wheel drive vehicle (in particular, a four-wheel drive vehicle in which rear wheels serve as main driving wheels). In a sport utility vehicle (SUV), wheels move up and down greatly, and angular displacement of drive shafts is large. Accordingly, the rear-wheel drive shaft comprising the constant velocity universal joints each having a low operating angle as described above is not applicable in some cases. Therefore, it is preferred that the above-mentioned rear-wheel drive shaft be applied to a rear-wheel drive automobile or a four-wheel drive automobile.

1 rear-wheel drive shaft
2 plunging type constant velocity universal joint
21 outer joint member
22 inner joint member
23 ball
24 cage
3 fixed type constant velocity universal joint
31 outer joint member
32 inner joint member
33 ball
34 cage
4 intermediate shaft
E engine
G differential gear
M transmission
PS propeller shaft
W wheel

The invention claimed is:
1. A rear-wheel drive shaft, comprising:
a fixed type constant velocity universal joint comprising:
a first outer joint member having a spherical inner peripheral surface in which eight track grooves extending in an axial direction of the fixed type constant velocity universal joint are formed;
a first inner joint member having a spherical outer peripheral surface in which eight track grooves extending in the axial direction of the fixed type constant velocity universal joint are formed, and having a spline hole formed along an axial center of the first inner joint member;
eight balls arranged in ball tracks formed by the track grooves of the first outer joint member and the track grooves of the first inner joint member; and
a first cage, which has eight pockets configured to receive the balls of the fixed type constant velocity universal joint, and is held in slide contact with the spherical inner peripheral surface of the first outer joint member and the spherical outer peripheral surface of the first inner joint member,
a curvature center of the track grooves of the first outer joint member and a curvature center of the track grooves of the first inner joint member being offset to opposite sides in the axial direction of the fixed type constant velocity universal joint with respect to a joint center by an equal distance;
a plunging type constant velocity universal joint comprising:
a second outer joint member having a cylindrical inner peripheral surface in which eight track grooves extending in an axial direction of the plunging type constant velocity universal joint are formed;
a second inner joint member having a spherical outer peripheral surface in which eight track grooves extending in the axial direction of the plunging type constant velocity universal joint are formed, and having a spline hole formed along an axial center of the second inner joint member;
eight balls arranged in ball tracks formed by the track grooves of the second outer joint member and the track grooves of the second inner joint member; and
a second cage, which has eight pockets configured to receive the balls of the plunging type constant velocity universal joint, and is held in slide contact with the cylindrical inner peripheral surface of the second outer joint member and the spherical outer peripheral surface of the second inner joint member,
a curvature center of a spherical portion formed in an outer peripheral surface of the second cage and a curvature center of a spherical portion formed in an inner peripheral surface of the second cage being offset to opposite sides in the axial direction of the plunging type constant velocity universal joint with respect to a joint center by an equal distance; and
an intermediate shaft comprising:
an outboard-side spline to be fitted into the spline hole of the first inner joint member of the fixed type constant velocity universal joint; and
an inboard-side spline to be fitted into the spline hole of the second inner joint member of the plunging type constant velocity universal joint,
wherein a ratio $PCD_{BALL}(f)/D_{BALL}(f)$ of a pitch circle diameter $PCD_{BALL}(f)$ of the balls of the fixed type constant velocity universal joint to a diameter $D_{BALL}(f)$ of each of the balls of the fixed type constant velocity universal joint is set from 3.70 to 3.87,
wherein a ratio $PCD_{BALL}(s)/D_{BALL}(s)$ of a pitch circle diameter $PCD_{BALL}(s)$ of the balls of the plunging type constant velocity universal joint to a diameter $D_{BALL}(s)$ of each of the balls of the plunging type constant velocity universal joint is set from 3.3 to 3.6,
wherein a ratio $PCD_{SPL}(f)/D_{BALL}(f)$ of a pitch circle diameter $PCD_{SPL}(f)$ of the spline hole of the first inner joint member of the fixed type constant velocity universal joint to the diameter $D_{BALL}(f)$ of each of the balls of the fixed type constant velocity universal joint is set from 1.82 to 1.92, and
wherein a ratio $PCD_{SPL}(s)/D_{BALL}(s)$ of a pitch circle diameter $PCD_{SPL}(s)$ of the spline hole of the second inner joint member of the plunging type constant velocity universal joint to the diameter $D_{BALL}(s)$ of each of the balls of the plunging type constant velocity universal joint is set from 1.70 to 1.85.
2. The rear-wheel drive shaft according to claim 1, wherein the fixed type constant velocity universal joint and the plunging type constant velocity universal joint each have a maximum operating angle of 20° or less.

3. The rear-wheel drive shaft according to claim 1, wherein the intermediate shaft is hollow.

\* \* \* \* \*